United States Patent
Baird

(10) Patent No.: US 10,223,693 B2
(45) Date of Patent: *Mar. 5, 2019

(54) SYSTEM AND METHOD FOR ADMINISTERING BILLING, SERVICING MESSAGING AND PAYMENT IN DIGITAL WALLETS

(71) Applicant: Garrett Cameron Baird, Philadelphia, PA (US)

(72) Inventor: Garrett Cameron Baird, Philadelphia, PA (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/848,545

(22) Filed: Sep. 9, 2015

(65) Prior Publication Data

US 2016/0071074 A1 Mar. 10, 2016

Related U.S. Application Data

(60) Provisional application No. 62/048,164, filed on Sep. 9, 2014.

(51) Int. Cl.
*G06Q 20/36* (2012.01)
*G06Q 20/10* (2012.01)
*G06Q 20/14* (2012.01)
*G06Q 20/32* (2012.01)
*G06Q 30/04* (2012.01)

(52) U.S. Cl.
CPC ......... *G06Q 20/367* (2013.01); *G06Q 20/102* (2013.01); *G06Q 20/14* (2013.01); *G06Q 20/322* (2013.01); *G06Q 20/3276* (2013.01); *G06Q 20/363* (2013.01); *G06Q 30/04* (2013.01)

(58) Field of Classification Search
USPC .......................... 705/40, 44, 39, 37, 38, 26
See application file for complete search history.

(56) References Cited

U.S. PATENT DOCUMENTS

| | | | |
|---|---|---|---|
| 5,465,206 A | 11/1995 | Hilt | |
| 5,590,197 A | 12/1996 | Chen | |
| 5,963,925 A * | 10/1999 | Kolling | ................. G06Q 20/00 705/26.1 |
| 6,609,113 B1 | 8/2003 | O'Leary | |

(Continued)

*Primary Examiner* — Tien C Nguyen
(74) *Attorney, Agent, or Firm* — Creativenture Law, LLC; Dennis J M Donahue, III; Kevin C. Staed

(57) ABSTRACT

A digital wallet bill management system runs on centralized processors in operative communication with databases and in networked communication with digital wallet applications, computerized billing systems and payment gateways. Code snippet activators are provided to customers running digital wallet applications on their respective electronic devices. When customers activate the code snippet information, the digital wallet bill management system produces biller e-cards for the digital wallet applications, linking customer accounts to the billing system for the respective customers. The code snippets include biller codes, customer codes and URL addresses, and the system matches the codes with data stored in the database for the respective biller and customer and transmits the biller e-card information to the respective electronic devices for the digital wallet application. The customers use funding e-cards in their digital wallets to produce electronic bill payment records for electronic bills that the system populates using the biller e-cards.

20 Claims, 11 Drawing Sheets

(56) References Cited

U.S. PATENT DOCUMENTS

| | | | |
|---|---|---|---|
| 7,752,095 B1* | 7/2010 | Laracey | G06Q 40/00 705/34 |
| 8,180,705 B2 | 5/2012 | Kowalchyk | |
| 8,444,048 B1* | 5/2013 | Nidamarthi | G06Q 30/016 235/375 |
| 8,527,413 B2 | 9/2013 | Heller | |
| 8,583,548 B1 | 11/2013 | Goldstein | |
| 8,694,032 B1* | 4/2014 | Kilpatrick | H04W 4/12 455/466 |
| 9,595,028 B2* | 3/2017 | Davis | G06Q 20/02 |
| 2001/0037295 A1* | 11/2001 | Olsen | G06Q 20/102 705/40 |
| 2002/0059114 A1* | 5/2002 | Cockrill | G06Q 20/04 705/26.81 |
| 2002/0121546 A1* | 9/2002 | Clark | G06Q 30/02 235/383 |
| 2004/0254859 A1* | 12/2004 | Aslanian, Jr. | G06Q 10/107 705/14.73 |
| 2005/0246550 A1* | 11/2005 | Orbke | G06Q 10/107 713/182 |
| 2006/0169767 A1* | 8/2006 | Moulton | G06Q 20/341 235/380 |
| 2007/0073808 A1* | 3/2007 | Berrey | G06O 10/10 709/204 |
| 2007/0090182 A1* | 4/2007 | Phagura | G06Q 10/06 235/380 |
| 2008/0126145 A1* | 5/2008 | Rackley, III | G06Q 20/102 455/406 |
| 2009/0216726 A1* | 8/2009 | Muthaiah | G06Q 30/04 |
| 2009/0327126 A1* | 12/2009 | Schoenberg | G06Q 20/102 705/40 |
| 2010/0138338 A1* | 6/2010 | Hammad | G06Q 20/10 705/39 |
| 2011/0010283 A1* | 1/2011 | Williams | G06Q 20/352 705/35 |
| 2011/0136516 A1* | 6/2011 | Ellis | H04W 4/14 455/458 |
| 2011/0208629 A1* | 8/2011 | Benefield | G06Q 40/00 705/35 |
| 2012/0010932 A1* | 1/2012 | Satyavolu | G06Q 30/0215 705/14.17 |
| 2012/0078782 A1* | 3/2012 | Schoenberg | G06Q 20/102 705/40 |
| 2013/0144789 A1 | 6/2013 | Aaltonen | |
| 2013/0346302 A1* | 12/2013 | Purves | G06Q 20/102 705/40 |
| 2014/0222669 A1* | 8/2014 | Novak | G06Q 20/14 705/40 |
| 2015/0254645 A1* | 9/2015 | Bondesen | G06Q 20/363 705/41 |
| 2016/0086155 A1* | 3/2016 | Candelore | G06Q 20/3224 705/21 |
| 2016/0086188 A1* | 3/2016 | Candelore | G06Q 20/425 705/44 |

* cited by examiner

SYSTEM AND METHOD FOR ADMINISTERING BILLING, SERVICING MESSAGING AND PAYMENT IN DIGITAL WALLETS

CROSS-REFERENCE TO RELATED APPLICATIONS

This application claims the benefit of U.S. Provisional Patent Application No. 62/048,164 filed Sep. 9, 2014, which is hereby incorporated by reference.

STATEMENT REGARDING FEDERALLY SPONSORED RESEARCH

Not Applicable.

APPENDIX

Not Applicable.

FIELD OF THE INVENTION

The present invention relates to a computer system and methods for establishing, managing and administering billing relationships within digital wallet applications.

BACKGROUND OF THE INVENTION

Electronic bill payment systems and digital wallets have been known for decades, and digital wallets have become their own category of service with many providers administering these means of storing digital representations of traditionally paper or plastic objects like: forms of payment (credit and debit cards), loyalty cards, coupons, event tickets and membership cards (digital wallet individual customer e-cards). However, bill providers and other bill paying entities do not currently allow for the presentment, payment or management of bills and billing relationships with customers within these digital wallets. As such, consumers cannot currently receive, review, manage or pay bills within digital wallet applications. Examples of prior mobile payment systems may be found, for example, in U.S. Pat. Nos. 6,609,113, 8,180,705, 8,527,413, and 8,583,548, and in U.S. Patent App. Pub. No. 2013/0144789, the contents of which are hereby incorporated by reference in its entirety. In the known patented systems, it is evident that bills can be paid electronically, such as through an electronic funds transfer (EFT) and other electronic payment options which may use a credit card, a debit card, a bank account or other funding or credit accounts residing in a financial institution. The payments may be made by the various means described in the references, such as through an app on a smart-phone or other mobile device or a web browser on a tablet or personal computer.

Generally, even when there is an established billing and payment relationship between a biller and a customer, to electronically pay bills, the burden is placed on the customer to set up an electronic payment relationship with the biller within one of the customer's credit accounts or in a special account within the biller's system (that connects to one of the customer's credit accounts) or within some third party system which connects the customer's biller accounts with the customer's credit accounts. In some instances, the system can be an application that is available from the biller, a financial institution (such as a credit card company or a bank), or a third party which the user must first download into their smart-phone or other mobile device as a unique mobile app. In other cases, the systems are available through web browsers. However, although a customer may already have established an electronic relationship with a credit account holder and another electronic relationship with a biller, these previous systems make no attempt to create the connection for the customer between the existing electronic relationships. Instead, as indicated above, the customer has the burden to create the connection in one of the systems.

Although digital wallets and electronic bill pay systems at the customer user level have been known for more than twenty years, as indicated by U.S. Pat. Nos. 5,590,197 and 5,465,206, there has still been no attempt to provide customers with a payment platform in which they can easily connect their existing electronic relationships with their billers (i.e., providers of goods and/or services) to their existing electronic relationships with the financial institutions in which they have their credit and funding accounts. In particular, even though there have been various digital wallet applications that customers have been able to use for their own individual customer e-cards, there has been no way for these customers to pay their bills and manage their bill payments within their digital wallet applications. Similarly, from the billers' perspectives, there has been no way to connect with their customers through the customers' digital wallet applications even when they have an established electronic relationship with their customers. Accordingly, there remains a need in the electronic bill pay systems and digital wallet systems to provide customers with a bridge between existing electronic relationships that they have established with billers and financial institutions.

SUMMARY OF THE INVENTION

The present invention is a method and a system for bill presentment and bill payment via a digital wallet as summarized in this section of the specification and as set forth in the claims at the end of this specification. The digital wallet application bill presentment and payment system is established with a computer processor, input-output, and memory. The system acts for and in communication with digital wallet service providers, and with at least one biller of services and payment processor directly or via a consolidator acting on behalf of each of the respective billers, and further in communication with payment gateways used by the billers. The digital wallet bill management system configures the digital bill presentment and payment system to enable communication with the customers of the billers through digital wallet applications for purposes of bill presentment, payment, content delivery and message/notification presentment. The digital wallet bill management system may its own stand-alone application or may be a part of an integrated billing system with a digital wallet system application.

The system creates and provides unique code snippet activator or information for each one of the billers. The snippet activator may be presented as a web link, a barcode or some other clickable or scannable code that billers may include in existing communications with customers. The snippet activator is used by the digital wallet application to link back to the digital bill system. When a customer/billpayer of a biller activates the code snippet (linking or scanning) the customer is registered with the biller as a user/customer (i.e., a user of the system as a customer who is a bill payer) and the initial digital bill is sent to the mobile bill presentment and payment system as it is associated with the enrolled user/customer.

When the customer/bill-payer first activates the code snippet, the system receives the request via the link and parses it to determine whether the request is for a cloud-based digital wallet provider or a device-based digital wallet provider. The system extracts any personalized data provided in the link for storage within the system, transformation by the system, and delivery to the digital wallet application. If the system is for a cloud-based digital wallet provider, a web page is returned that includes a button to complete the enrollment process for the customer. If the system is for a device-based digital wallet provider and the user request is from a smartphone, a transformed file is delivered to the device in a digital wallet-ready format by receiving the web service call from the device to complete the enrollment. If the system is for a device-based digital wallet provider and the user request is not from a smartphone, a web page is returned to present the customer with the option to email, SMS or scan a barcode to access the desired file.

The system receives and stores the updated bill detail information, transforms any or all of the data for the purposes of delivering a digital wallet-ready file, and distributes the updated digital bills to the devices or the cloud-based provider by following a series of steps: receiving the billing data via a file from the biller or biller service provider, parsing the file into the individual bill records, parsing the individual fields of the bill records, mapping to a set of biller-defined variables, storing the individual values of the variables in a database, assembling the digital-wallet ready response by combining the biller's configuration settings including design, format and data mapping specifications, the individual bill data and rules specific to the provider platform, transforming the data into a digital wallet-ready response with the updated digital bill information, running through a segmentation engine to filter out members of the digital bill holding population that should not receive an update based on biller-defined rules, sending the response to the internal digital bill processor to transform for a cloud-based provider or a device-based provider, sending the updated bill information in appropriate format to the device of a device-based provider and the server of a cloud-based provider.

The system can also send messages to the devices holding the digital bill. The system receives the messaging request from the biller or biller service provider, populates a template message with dynamic variable information, such as a merge of personalized information with the template to form merged message data, and forms the response with the merged message data. Before distributing the message, the system runs the member distribution list through a segmentation engine to filter out members of the digital bill holding population that should not receive a message based on biller-defined rules. The system sends the completed message to the internal digital bill processor to transform for a cloud-based provider or a device-based provider, and sends the message in the appropriate format to the device of the device-based provider and the server of the cloud-based provider.

The system connects to payments web pages to pay the digital bill and also connects to a bill repository to retrieve and present a full electronic copy of the digital bill. In paying the digital bill, the system follows a sequence of steps: linking from the digital bill to system provided web pages including digital bill data to pre-populate the pages, taking the payment instruction and processing it through the biller's payment gateway. To present the full digital bill, the system links from the digital bill to a web linked bill repository and returns the requested bill file to the user-specific electronic device of the unique customer.

In each aspect of the invention, the system provides the snippet code as a unique interface within a digital wallet system to connect bill payers and billers by using existing digital wallet information for the bill payer and the biller without requiring the creation of a separate application. The snippet code creates a digital billing e-card through which billers can distribute bills to their customers, i.e., the bill payers, and the bill payers can pay their bills electronically using their existing funding e-cards that they have in their digital wallets.

BRIEF DESCRIPTION OF THE DRAWINGS

The foregoing and other features and advantages of the invention will be apparent from the following, more particular description of various embodiments, as illustrated in the accompanying drawings wherein like reference numbers generally indicate identical, functionally similar, and/or structurally similar elements. The first digits in the reference number generally indicate the drawing in which an element first appears. Unless otherwise indicated, the accompanying drawing figures are not to scale.

DETAILED DESCRIPTION

Illustrative embodiments are discussed in detail below. While specific embodiments are discussed, it should be understood that this is done for illustration purposes only. In describing and illustrating the embodiments, specific terminology is employed for the sake of clarity. However, the embodiments are not intended to be limited to the specific terminology so selected. A person skilled in the relevant art will recognize that other components and configurations may be used without departing from the spirit and scope of the embodiments. It is to be understood that each specific element includes all technical equivalents that operate in a similar manner to accomplish a similar purpose. The examples and embodiments described herein are non-limiting examples.

Furthermore, the embodiments detailed below may be combined into a new embodiment and/or various features of the embodiments described below may be combined to form a new embodiment.

All publications cited herein are hereby incorporated by reference in their entirety. As used herein, the term "a" refers to one or more. The terms "including," "for example," "such as," "e.g.," "may be" and the like, are meant to include, but not be limited to, the listed examples.

Figure 1:
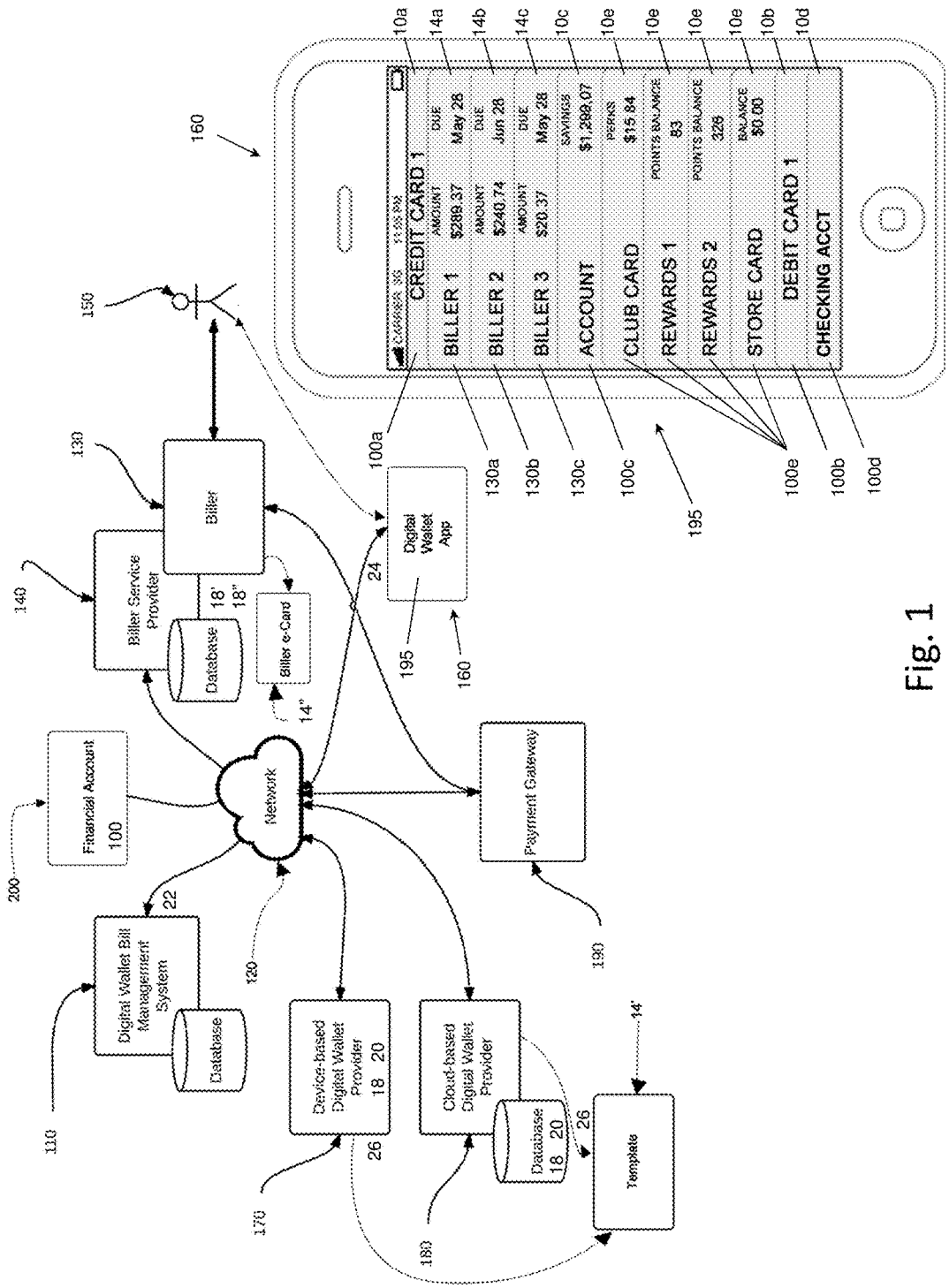
FIG. 1 illustrates a digital wallet billing administration system including integrated systems and devices.

FIG. 1 depicts a digital wallet bill management system 110 comprised of one or more system computer operations centers, each containing one or more computer(s) programmed with software and associated components, such as telecommunications and storage systems for holding and storing the system data, and a location containing like equipment programmed with software from which control is exercised over the computers. The storage systems include one or more servers that hold system data that may be continually transformed and updated as transactions occur. The system 110 is connected to a network 120 that may be any network that can carry computer data, for example, the Internet, Ethernet, ISDN, DSL, coaxial cable, fiber optics, plain old telephone service (POTS) line, public switched telephone network (PSTN), satellite, cellular, wired, wireless, fixed line, serial, parallel, and others not listed here, but are obvious to persons of ordinary skill in the art.

System 110 may administer the creation and presentation of billing summaries, provide access to full billing statements, send customer service messages, and set up payments to enrolled customers within a digital wallet application.

In one embodiment of the invention, a digital wallet provider may use system 110 to administer platforms through which individual consumers may access personal digital wallets via web sites and/or mobile devices. Providers may store these digital representations and the data associated with them either in a hosted server (e.g., cloud-based) or on a mobile device (e.g., device-based) of a user.

Billing relationships may have been administered via multiple channels over time including mailed billing statements, web-based bill presentment and payment services, telephone-based summary bill and payment services and to a much lesser extent mobile application based bill presentment and payments.

In one embodiment, a comprehensive billing relationship may be integrated with digital wallets, providing a complete administrative system for billers, their service providers and/or other entities. Administration of a billing relationship within, for example, cloud-based and device-based digital wallet applications may be provided. The system 110 may include, for example, biller set up and management capabilities, automated distribution, presentment, updates, payment and full bill presentment to enrolled customers whether through a cloud-based (e.g., digital bills stored in a remote datastore) or device-based (e.g., digital bills stored locally on the device) digital wallet application.

In one embodiment, biller entity 130 may be provided that sends bills to customer entities (e.g., persons or other legal entities) 150 that pay bills directly or indirectly to the biller entity 130. The biller entity 130 may be a company providing goods or services to customer entities 150 and generating periodic bills for these customer entities 150 with a need to receive payments for those bills. For example, companies could provide utility services (i.e., electric, gas, water, sewer, communications—phone/internet/television, etc.), financial services (credit &/or debit card, banking, insurance, tax preparation, etc.) or other services (home maintenance, car repair, education &/or tutoring, etc.) or they may provide products, such as newspapers, magazines and other media. A bill payment consolidator or biller service provider (BSP) entity 140 may be an agent of the biller entity 130 that provides an electronic bill presentment and payment (EBPP) service for the biller entity 130. This may also include a biller service provider that provides consolidation of multiple billers' data for use in a financial institution's bill payment services where billing data is provided for a series of billers that have been associated with a banking customer's payment account such as a checking or savings account. The bank may then choose to group together the bills associated with that account using the bank's bill payment service across multiple billers.

A payment processor entity 190 may be a company (e.g., a third party) appointed by a biller 130 to handle payment card (including credit and debit) and ACH (automated clearing house) transactions for biller 130. Payment processors may charge credit cards, debit cards, and perform electronic check transactions and also provide results to the biller 130 and/or BSP 140. A BSP 140 may also be the payment processor on behalf of the biller 130. Biller entities 130 or BSPs 140 may be in communication with the payment gateway 190 for the purposes of receiving payment funds and recording the results of payment transactions on each customer's account.

In one embodiment, a biller service provider entity 140 may have established relationships with a number of biller entities 130. The biller service provider entity 140 typically offers a number of payment centers where the biller entity's customer entity 150 can walk in and pay their bills. Because of this existing relationship, the bill payment consolidator entity 190 may already have an established information feed relating to the biller entity's customer entities 150 and the customer's bill details, such as, account numbers and account balances. Accordingly, when biller entities are described in the specification and the billing system is recited in the claims, reference is generally being made to a computerized billing system that is used by the biller company itself, the biller service provider, or both types of entities. Similarly, when a payment processor is recited in the claims, it will be appreciated that the payment processor is a payment processing system which is performing the payment processing tasks as described above for any one of the entities that serves in this role. It is entirely possible that payment processing could be performed in an enterprise-level system with the same entity that operates the billers' computerized billing system and may even have the digital wallet bill management system of the present invention incorporated therein a digital wallet tool. Therefore, although the schematic drawing of FIG. 1 shows the functionality of the digital wallet bill management system as being separate from the billing system of the biller and/or biller service providers and also separate from the digital wallet providers' systems, it will be appreciated that the actual configuration of the computer system may be an integrated system performed by a single entity or a distributed system performed by different entities.

Two types of digital wallet service providers may be provided: a cloud-based digital wallet service provider 180 and/or a device-based digital wallet service provider 170. The cloud-based provider 180 may manage digital bills in a database and their accompanying application may be a representation of the contents of that database. Device-based digital wallet providers 170 may instead store digital bills per customer on the mobile device itself 160. Device-based digital wallet providers 170 may also store that information in their own database, but what is rendered to the customer reflects what is currently stored on the device 160. A customer 150 must enroll in the cloud-based service 180 and have an accompanying account with the service provider 180. The device-based service provider 170 does not require such an account only the presence of the digital wallet application on one's mobile device.

The customer's mobile device 160 may contain one or more digital wallet applications 195 that display the digital bills 14″ that the customer has received through the distribution process (e.g., FIG. 3) according to the present invention and chosen to store within a digital wallet as a mobile bill presentment and payment e-card 14 (i.e. a biller e-card). As is apparent from the description below, the biller e-card 14 has a similar look and feel to the customer as existing digital wallet individual customer e-cards 10 with which the customer is already familiar, such as credit e-cards 10*a*, debit e-cards 10*b*, reward e-cards 10*e* and other e-cards 10*c*, 10*d* that are electronically linked to the customer's accounts 100 with various businesses as well as the customer's sources of funds, such as accounts with credit card companies 100*a*, checking and savings accounts with banks or other financial institutions 100*b*, 100*c*, 100*d*. The present invention goes beyond the traditional uses of digital wallets to create the biller e-cards 14*a*, 14*b*, 14*c* within the same digital wallets which permit the customers to use their own funding e-cards 10*a*, 10*b*, 10*e*, 10*d* to pay and manage their billing activities through the same digital wallet application 195. This integrated digital wallet/bill pay system approaches the electronic billing and bill pay methodology from an entirely different perspective than has been previously contemplated for currently known systems. The different perspective is evident in the simplified processes for setting up billing card templates 14′, distributing e-billing card code snippet activators 12 to customers and enrolling customers to integrate the biller's electronic bill pay platform into digital wallet systems. As explained in detail below, digital wallet service providers 170, 180 and billers 130*a*, 130*b*, 130*c* provide customers with a code snippet activator 12 which creates a mobile bill presentment and payment e-card 14 for the biller in the customer's existing digital wallet application 195 and links the customer's biller e-card 14 with the customer's funding e-cards 10 that are already stored in the digital wallet or that the customer may add at some later time.

Figure 2:
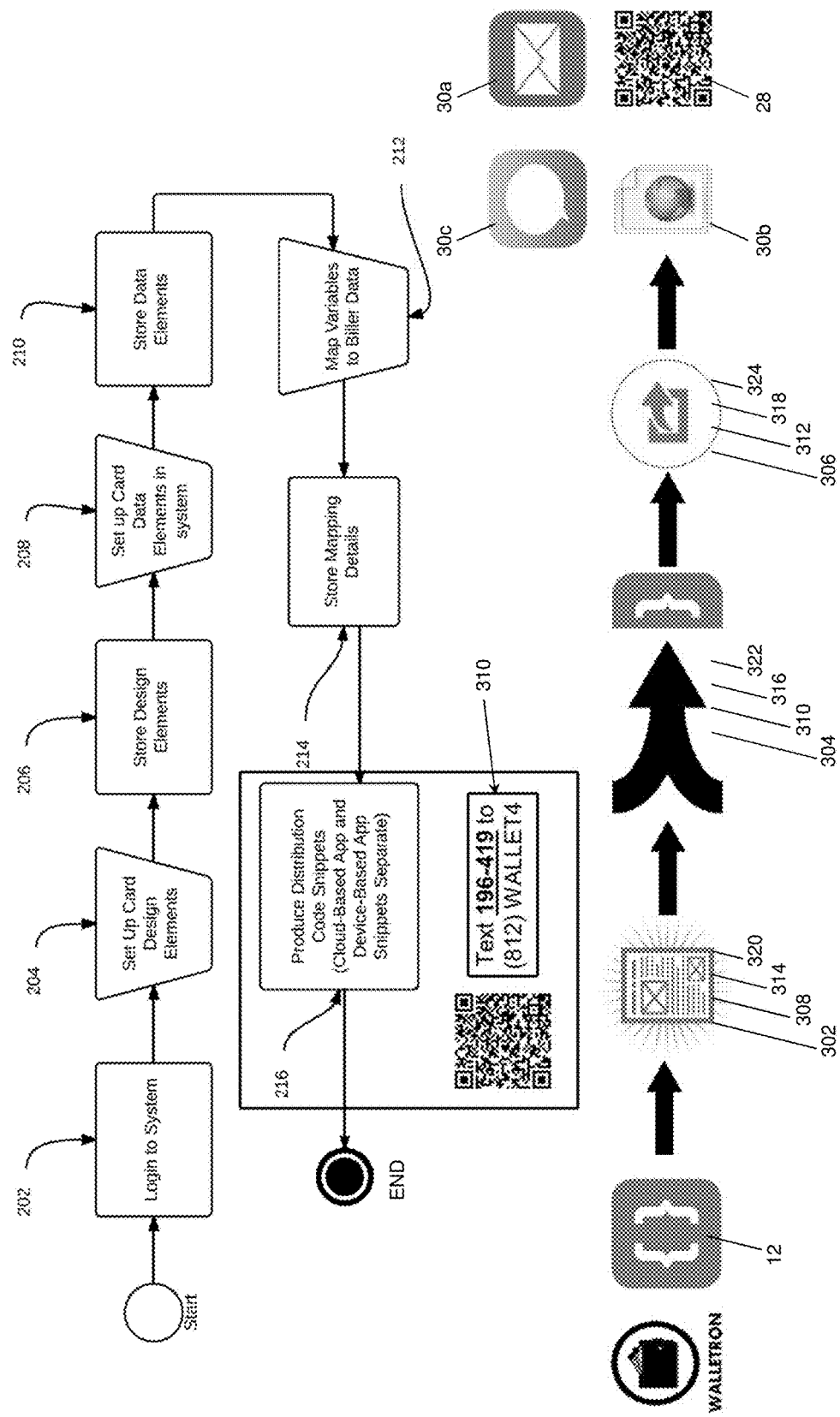
FIG. 2 depicts a digital bill template setup.

FIG. 2 depicts the setup process for a biller 130 that may identify elements of the digital bill to be managed within each user's device 160 or cloud based digital wallet provider database. In 202, the biller's 130 user may access an embodiment of the invention via, for example, a web application and logs in using the credentials provided. From 202, flow may move to 204. For bank-based bill payment services where the bank presents its customers with multiple biller relationships for payment, the bank would take on the role of biller for the purposes of FIG. 2.

In 204, design elements of the digital bill may be configured by, for example, the biller user uploading images, choosing colors and associating those with a template being created. The template stores all of the metadata related to the biller's 130 digital bill. The combination of the template with an individual customer's billing data is used to render the digital bill. From 204, flow may move to 206.

In 206, the selected settings may be saved to a storage repository such as a database. From 206, flow may move to 208.

In 208, the user may also configure data elements within the template. These elements may include, but are not limited to, messages, customer name, account or customer identification number, current amount due, balance (if a stored value relationship), due date, last amount paid, last payment date, billing address, usage amount and any other relevant data points to the biller-customer relationship. During configuration, the source of the data elements may be chosen. Sources may include static or fixed (same value for every digital bill) that the biller can provide at initial render, and dynamic or variable that the biller can provide via an external service call. From 208, flow may move to 210.

In 210, data element settings may be stored. From 210, flow may move to 212.

In 212, if the chosen source of the data element's value in not fixed, it may be associated with a variable in the system that allows for personalized data to be initialized, stored (including the history of values per digital bill) and/or retrieved. From 212, flow may move to 214.

In 214, the mapping details may be stored. From 214, flow may move to 216.

In 216, elements selected may be processed and presented for the biller. Additionally, a snippet of code 12 for inclusion in digital forms of distribution 30 (e.g., email 30*a*, website 30*h*, SMS 30*c*) and a bar code 28 for use in physical media (e.g., paper billing statements 28*a*) may be created. The snippet is produced by the system to bridge the template settings, the biller data 18, 18' and the individual customer account 20. To achieve this, the system assembles the biller identifier 18, the template identification number 26, placeholders for the set of variables that may be passed by the biller for that customer's initial bill, a security token 18' to authenticate the biller and a unique identifier for that customer 20 to be used in matching the customer's bill data in future data received from the biller or biller service provider. The snippet is in the form of a URL 16 that refers back 22 to the bill presentment and bill payment system (i.e., Walletron digital wallet bill management system 110) with the biller identifier 18 and template identifier 26 in the base URL 16 and any variable information placeholders (including the customer identifier 20 and biller-unique security token 18') contained in the query string portion. The snippet 12 varies by digital wallet platform 38*a*, 38*b*. The snippet may be wrapped around an image 28 or simply presented as a link 30 anywhere a URL can be presented like the aforementioned web page 30*b*, email 30*a* or physical rendering 28*a* in a bar code. From 216, the flow may end.

Figure 3:
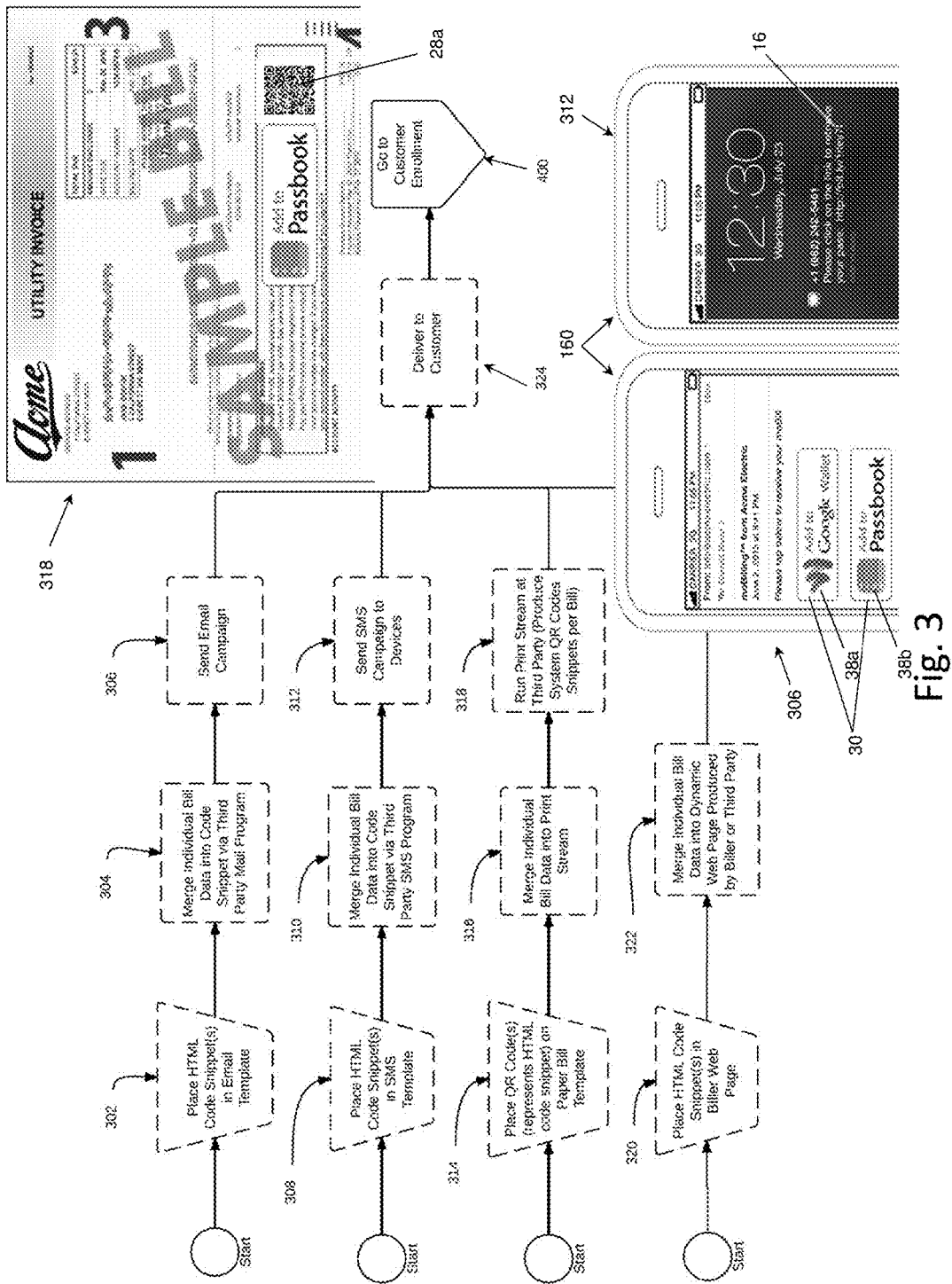
FIG. 3 is a flow chart illustrating processing performed in the distribution of digital bills to individual users through various distribution channels.

FIG. 3 depicts embodiments of transmission and receipt of the distribution code snippet (produced in 216), barcode and/or QR code via various distribution channels. In 302, 308, and/or 320, the biller 130 may choose to distribute the code snippet as a link. The biller replaces any variable information contained in the snippet query string with data placeholders for the individual accounts that are populated for each channel. In email, the variables are populated by the standard mail merge process. In SMS, the variables are also populated by a merge process. On a web page, the variables are populated by the server-side code that renders the page for that individual account. For QR codes, the printing process will render the individual data in the set of variables in the snippet. In 314, the biller 130 may choose to distribute a barcode and/or QR code representing the code snippet. For bank-based bill payment services where the bank presents its customers with multiple biller relationships for payment, the bank would take on the role of biller for the purposes of FIG. 3.

In 302, the code snippet may be rendered in email. From 302, flow may move to 304. In 304, the email distribution system may merge personalized information from the biller 130 into the code snippet. From 304, flow may move to 306 and email campaign may be transmitted to one or more destination email addresses. From 306, flow may move to 324. The email distribution system may also include transactional email in response to a customer action. For example, a payment confirmation email sent to a consumer after a payment is made to the biller may include the code snippet.

In 308, the code snippet may be set up in an SMS template. From 308, flow may move to 310. In 310, customer information may be merged into the code snippet. The resulting text may be run through a URL shortening system (e.g., bit.ly) to reduce the number of characters to under 160 characters to comply with, for example, the character limitation of SMS. From 310, flow may move to 312 and the SMS campaign may be transmitted to one or more devices via SMS. From 312, flow may move to 324.

In 314, the biller may choose to deploy the code snippet using a QR code or barcode representation to display the snippet on, for example, a web site, a letter, or a billing statement. The biller may place the template code snippet into a print template. From 314, flow may move to 316 where a printing fulfillment process, for example, may merge customer data with the QR code or barcode. From 316, flow may move to 318 were printed output may be produced for delivery to the customer 150. The biller may also choose to deploy the code snippet as a link within the biller's web site. From 318, flow may move to 324.

In 320, the snippet may be placed within the source code of the biller's 130 customer service web pages. In 322, customer data may be dynamically rendered when that customer access the biller web site page(s) that include the code snippet. From 322, flow may move to 324.

In 324, the code snippet may be provided and/or delivered to the customer to click or scan. From 324, flow may move to 400 and customer 150 may begin the enrollment process.

Figure 4:
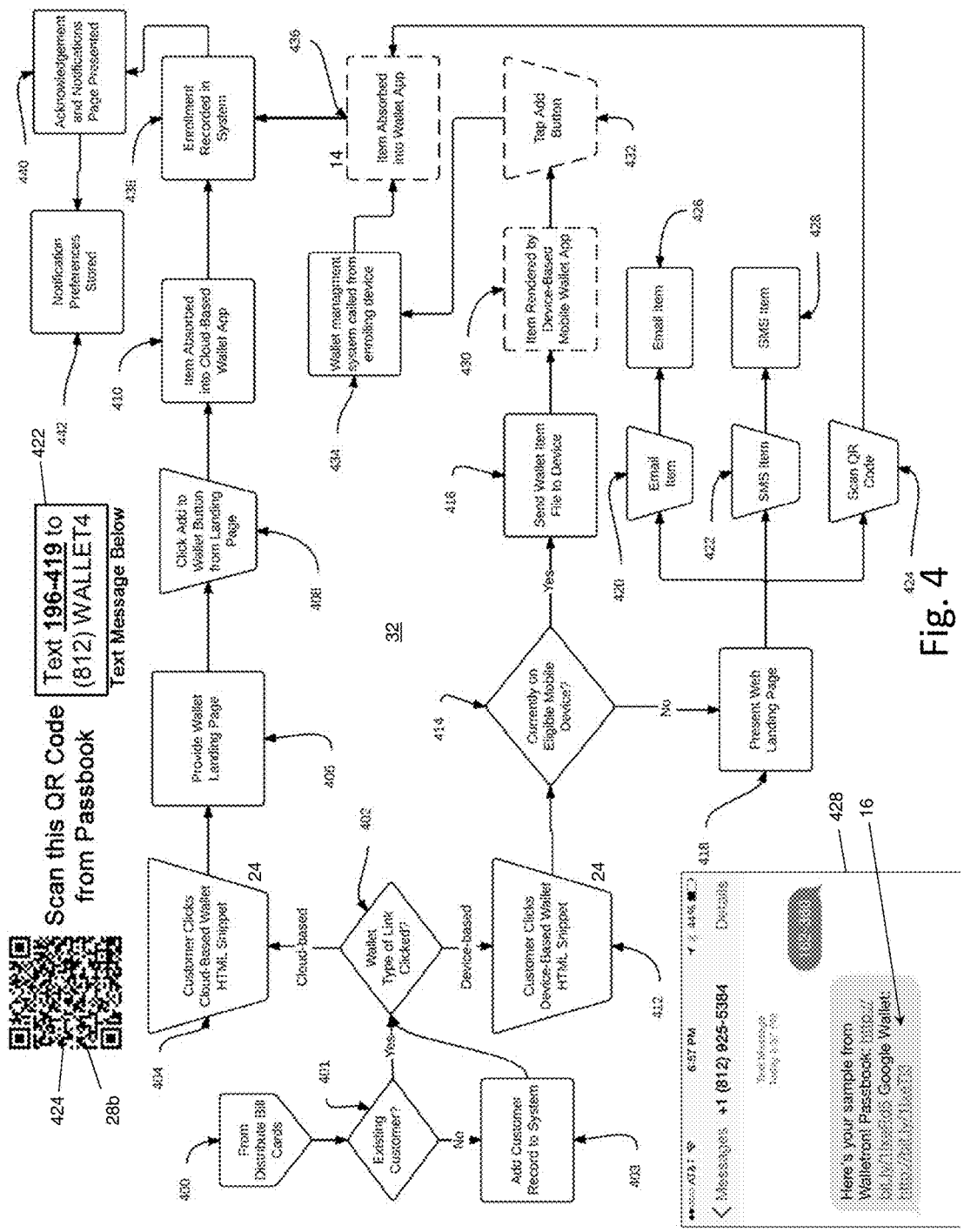
FIG. 4 depicts a flow chart of processes for establishing enrolled digital wallet users.

FIG. 4 illustrates example processing for the customer 150 enrollment process to manage the biller's 130 digital bill within the digital wallet applications 195 until the customer un-enrolls. In response to distribution 400, the customer 150 has engaged or otherwise activated a code snippet activator 12, i.e., clicked a link 30, scanned a QR code 28b, scanned a barcode, or selected some other code bearing the snippet information. As a result of clicking or scanning, customer 150 issues a request 24 (e.g., an HTTP request) through network 120 to the digital wallet bill management system 110. From 400, flow may move to 410. When the code snippet activator is engaged or otherwise activated (calling the URL 16 formed by the code snippet 12), a call 24 is made to the Walletron digital wallet bill management system 22. Immediately, the code snippet 12 is parsed. The system retrieves the biller identifier 18, the template identifier 26, security token 18', the customer account identifier 20 and any variable information passed in the query string portion of the URL 16. If the system does not find and match the identifiers or the expected security token, an appropriate error is returned and the process halts. If the identifiers and token are matched to data stored in the system, the process continues at 401 to perform the steps for adding the digital bill to the digital wallet application on the customer's electronic device. According to the process described below, the single action of clicking or scanning results a single-action biller e-card setup 32 for the digital wallet application 195, wherein in the network address 22 from the URL code 16, produces the electronic communication 24, receives the biller e-card information 14" from the digital wallet bill management system 110, and creates the biller e-card 14 in the digital wallet application according to the biller e-card information.

In 401, an evaluation may be made to determine whether this customer already exists in the system. If not, flow may move to 403. If so, flow may move to 402. In 403, customer 150 may be given a profile and the profile may be stored within a database. The customer profile may be updated with the device identifier and billing account identifier. From 403, flow may move to 402.

In 402, the type of digital wallet may be evaluated using the information contained in the distribution snippet. If the digital wallet is cloud-based, flow may move to 404. If the digital wallet is device based, flow may move to 412.

In 404, it may be determined that consumer 150 has a cloud-based digital wallet. From 404 flow may move to 406. In 406, a landing web page may be presented to the customer 150. The web page may present the cloud-based digital wallet application's enrollment link embedded within a link or button that connects to the provider's system 180 through the network 120. From 404, flow may move to 408. In 408, the link or button is selected. From 408, flow may move to 410. In 410, digital wallet bill management system 110 may receive a separate request from the provider 180. From 410, flow may move to 438. In 438, customer 105 enrollment may be recorded and confirmed in digital wallet bill management system 110.

In 412, it may be determined that consumer 150 has a device-based digital wallet. From 412, flow may move to 414. In 414, the contents of the request may be examined to determine whether the request came from an eligible mobile device. If an eligible device is detected, flow may move to 416. If an eligible device is not detected, flow may move to 418.

Figure 5:
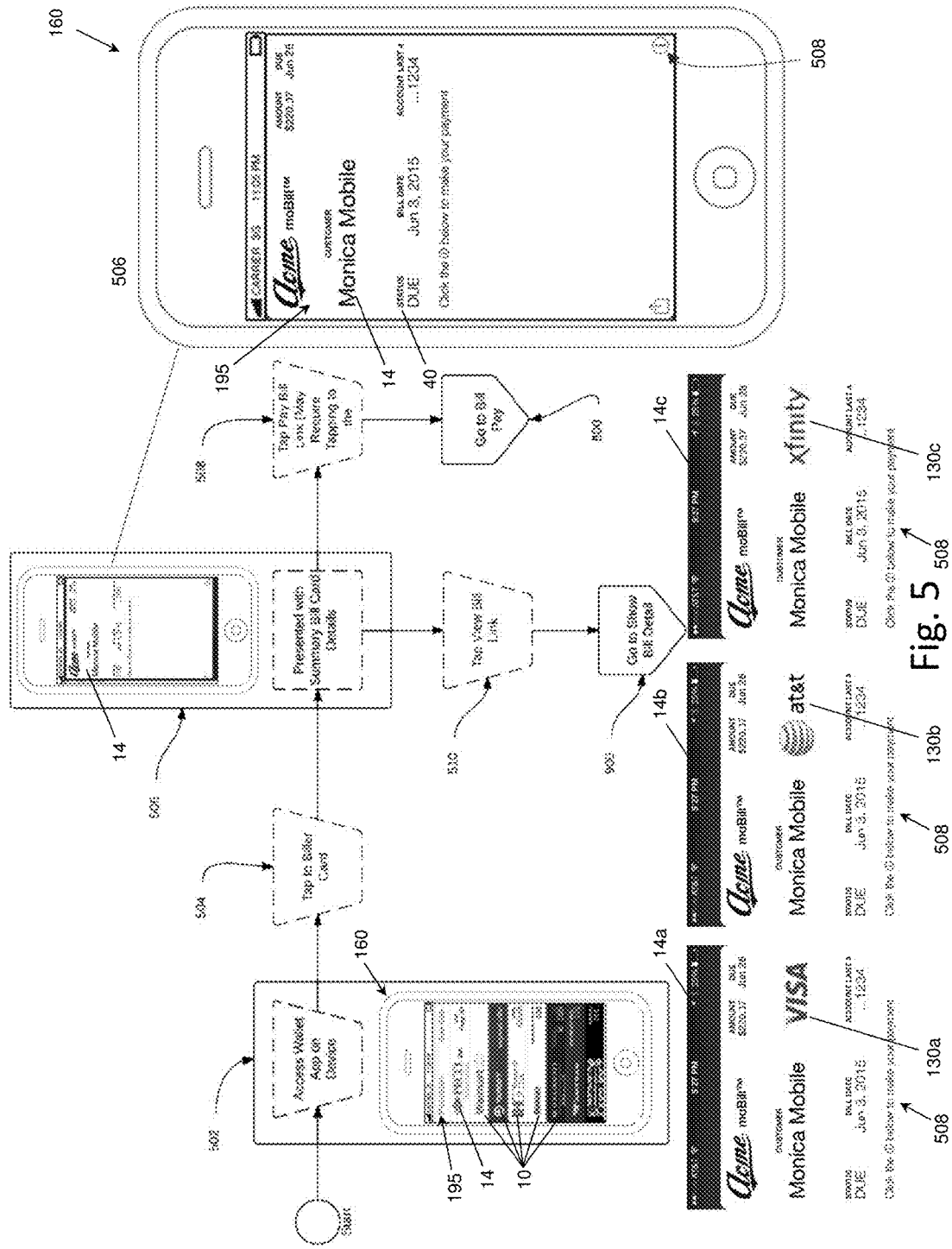
FIG. 5 is a flow chart illustrating processing performed in a user accessing a digital bill.

In 416, a file may be produced that is returned to the device 160 in the format specified by the provider 170 and containing the digital bill. From 416, flow may move to 430. In 430, device 160 may render the file on a display and may give customer 150 the option to add the digital bill to a digital wallet. From 430, flow may move to 432. In 432, customer 150 may choose to add the digital bill to a digital wallet, which may be accomplished by tapping an add link or button. From 432 flow may move to 434. In 434, the digital bill management system 110 is sent a notification that the device has received the digital bill. From 434, flow may move to 436. In 436, the digital bill management system 110 may add the digital bill to the device's digital wallet application, such as with a mobile bill presentment and payment e-card as shown in FIG. 5. In response to the successful add, the digital bill management system 110 enrolls the customer and his digital bill 438. Upon a successful enrollment, the system may direct the user to a biller-configurable page 440 that includes further information about the program and includes a set of preference settings that the user may turn on or off per notification. The initial setting per notification (on or off) is configured by the biller. The customer may submit changes to the preferences with those being stored in the system 442.

In 418, customer 150 was determined to not be on an eligible mobile device. Accordingly, the content of an HTML web page is returned to customer 150, providing options to customer 150. The options include email, SMS, or scanning a QR code or barcode. From 418, flow may move to 420, 422, or 424 depending on the customer 150 selection. In 420, the returned webpage may allow customer 150 to send an email by entering an email address. If an email is already on file, the email address is pre-populated in the web page. From 420, flow may move to 426 and a digital bill is emailed to the selected address. In 422, customer 105 may send an SMS message. From 422, flow may move to 428. In 428, the digital bill is delivered to a customer-specified phone number via SMS. In 424, a link to the digital bill is delivered in the form of a barcode. From 424, flow may move to 436 and flow may continue as described above.

FIG. 5 is an example flow chart illustrating processing performed in a user accessing a digital bill In 502, flow may start when a customer accesses the digital wallet application from a list of applications. From 502, flow may move to 504. In 504 the user may be presented with a digital bill and may receive additional detail by tapping the digital bill. From 504, flow may move to 506. In 506, the summary and detailed bill information that was added to the digital wallet application (e.g., see FIG. 4) may be presented. Additionally, links may be provided to pay a bill and/or links to present and/or download the full billing statement in PDF or other document format. Further links may provide access to the biller's mobile application native to the particular operating system of the device, a link to the biller's web site, and/or a link to system-provided services on behalf of the biller (all of which are configurable). From 506, flow may move to 508 or 510. In 508, customer 150 may have selected to pay the bill. From 508, flow may move to 800 (FIG. 8) and customer 150 may proceed with bill payment. In 510, customer 150 may have selected to view the bill. From 510, flow may move to 900 (FIG. 9) and the customer is presented with additional bill detail.

Figure 6:
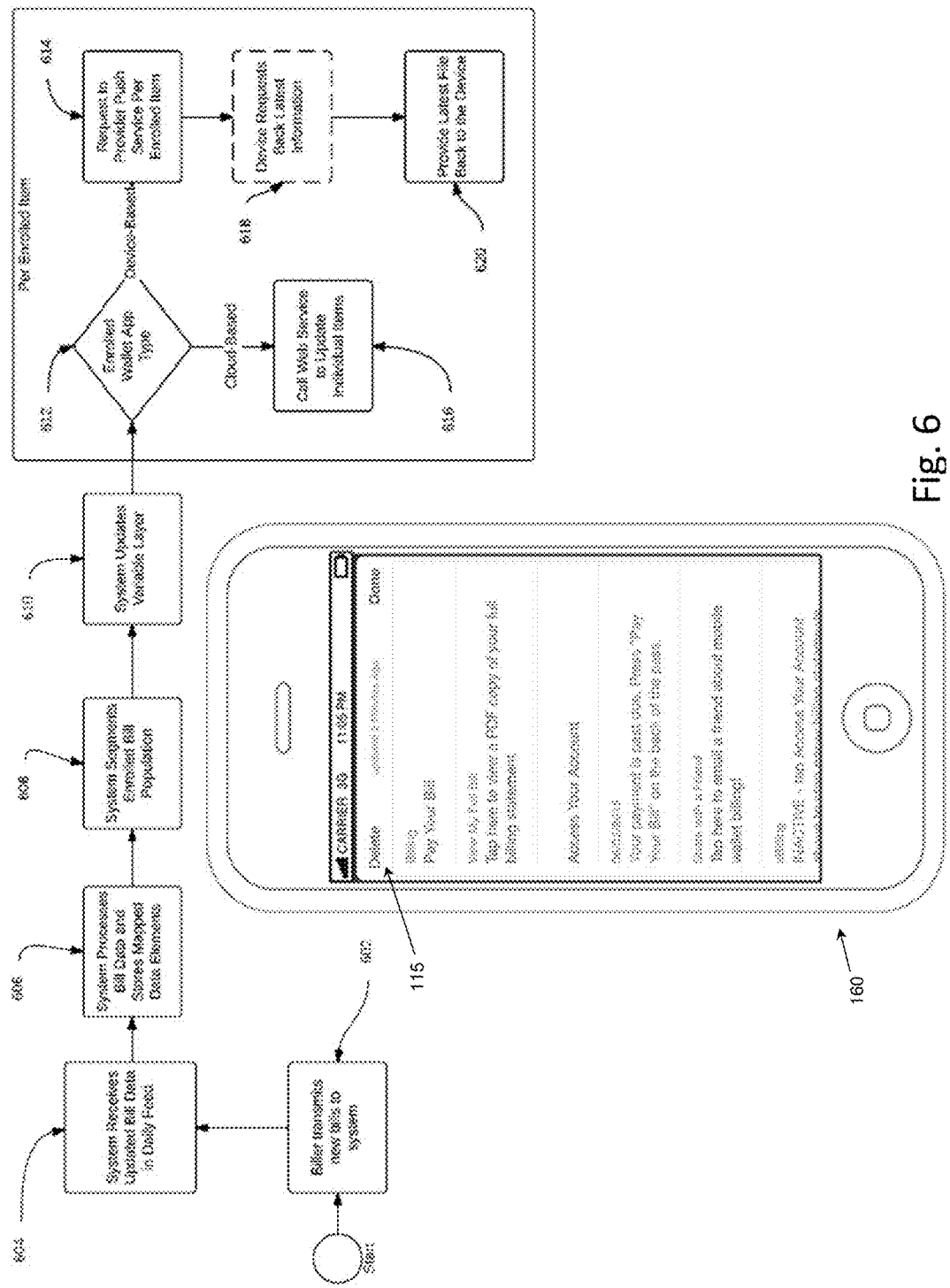
FIG. 6 is a flow chart illustrating processing performed in receiving new digital bills, updating the management system and distributing the updated digital bills to enrolled users.
Figure 10:
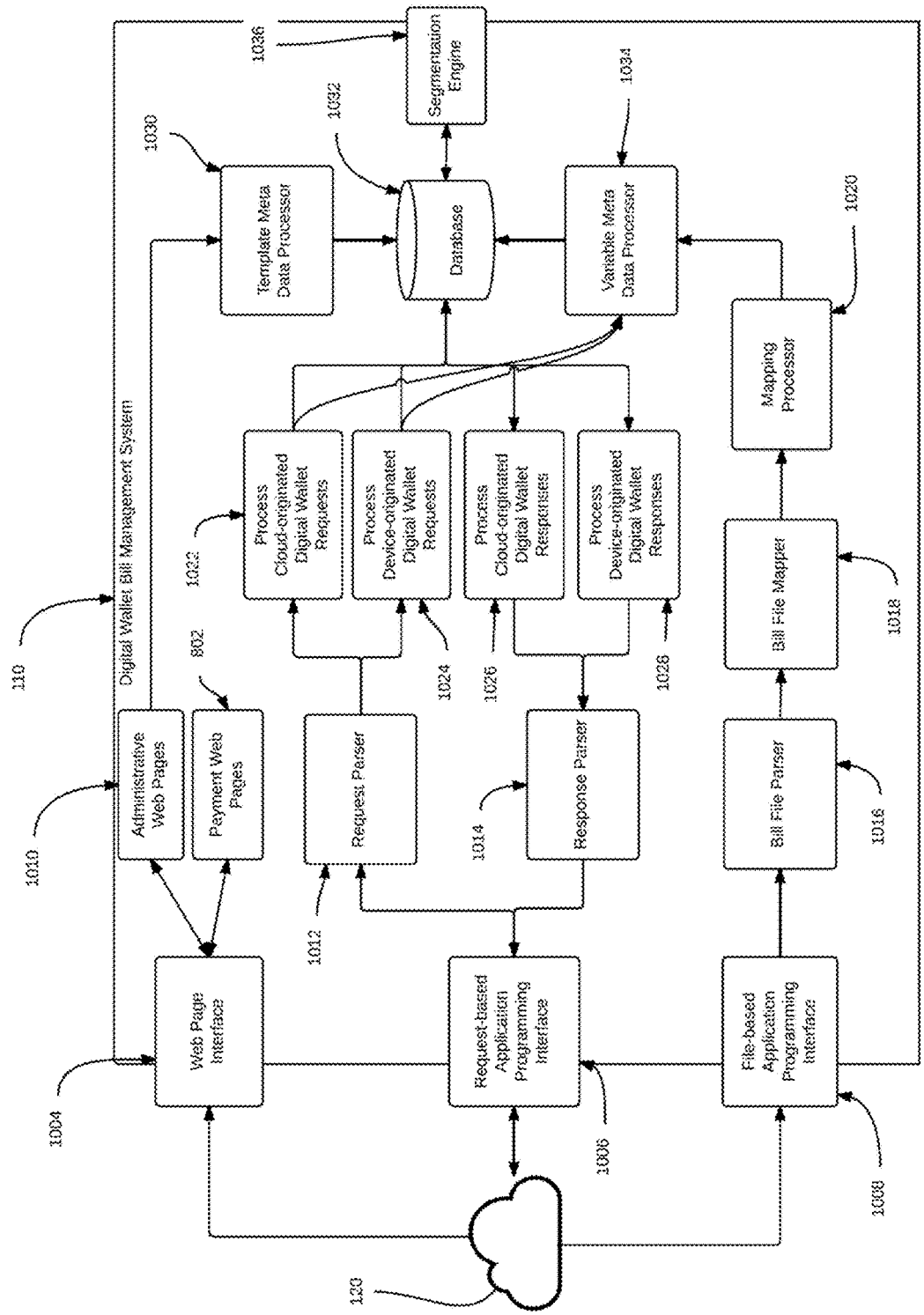
FIG. 10 depicts a of components used with a digital wallet billing administration in an embodiment of the present invention.

FIG. 6 illustrates an example of the receipt, processing and distribution of new bills to enrolled users' digital wallet applications. In 602, the biller 130, either directly or through BSP 140, distributes on as frequent a basis as needed, typically daily, a file of bill information to the digital wallet bill management system 110 through network 120. From 602, flow may move to 604. In 604, the file of newly processed bills may be received and processed by the digital wallet bill management system 110 through a parsing algorithm (e.g., see FIG. 10, item 1016) that matches the bill record to enrolled customers within the system. From 604, flow may move to 606. In 606, if a match is found, the bill record is parsed and processed in the system. If the billing record does not match an enrolled customer, the record is skipped. From 606, flow may move to 608. In 608, the digital wallet bill management system 110 may segment the enrolled population into those that received an updated bill record and those that did not. From 608, flow may move to 610. In 610, the digital wallet bill management system 110 determines those that did receive an updated bill and maps the bill record to match the fields in the billing record to those configured as variables and updates those mapped variables with the latest bill data (e.g., see FIG. 10, items 1018, 1020, 1034). From 610, flow may move to 612. In 612, enrolled customer records are reviewed to determine the type of digital wallet. The digital wallet bill management system 110 may distribute the updated bill information to either the device-based digital wallet platform 170 or the cloud-based platform 180 or both per enrolled customer. From 612, flow may move to 614 or 616 depending on the wallet type. When the system decides the wallet type at 612, it runs the data through an automated process to transform and properly format the data for delivery to the wallet. This includes selecting the data for delivery, transforming the data types from the received string type to that of the wallet fields. Next, the system formats the data for delivery to the wallet in forms such as XML, JSON, HTTP POST. In 616, if the type is determined to be cloud-based, a web service call may be made to update that customer's digital bill (FIG. 10). In 614, if the type is determined to be device-based, a push notification may be sent. From 614, flow may move to 618. In 618, the push notification may cause the device to request the latest digital bill from the system. From 618 flow may move to 620. In 620, the digital bill may be provided to the device 160 in the form of a file in a device-based wallet provider format.

Figure 7:
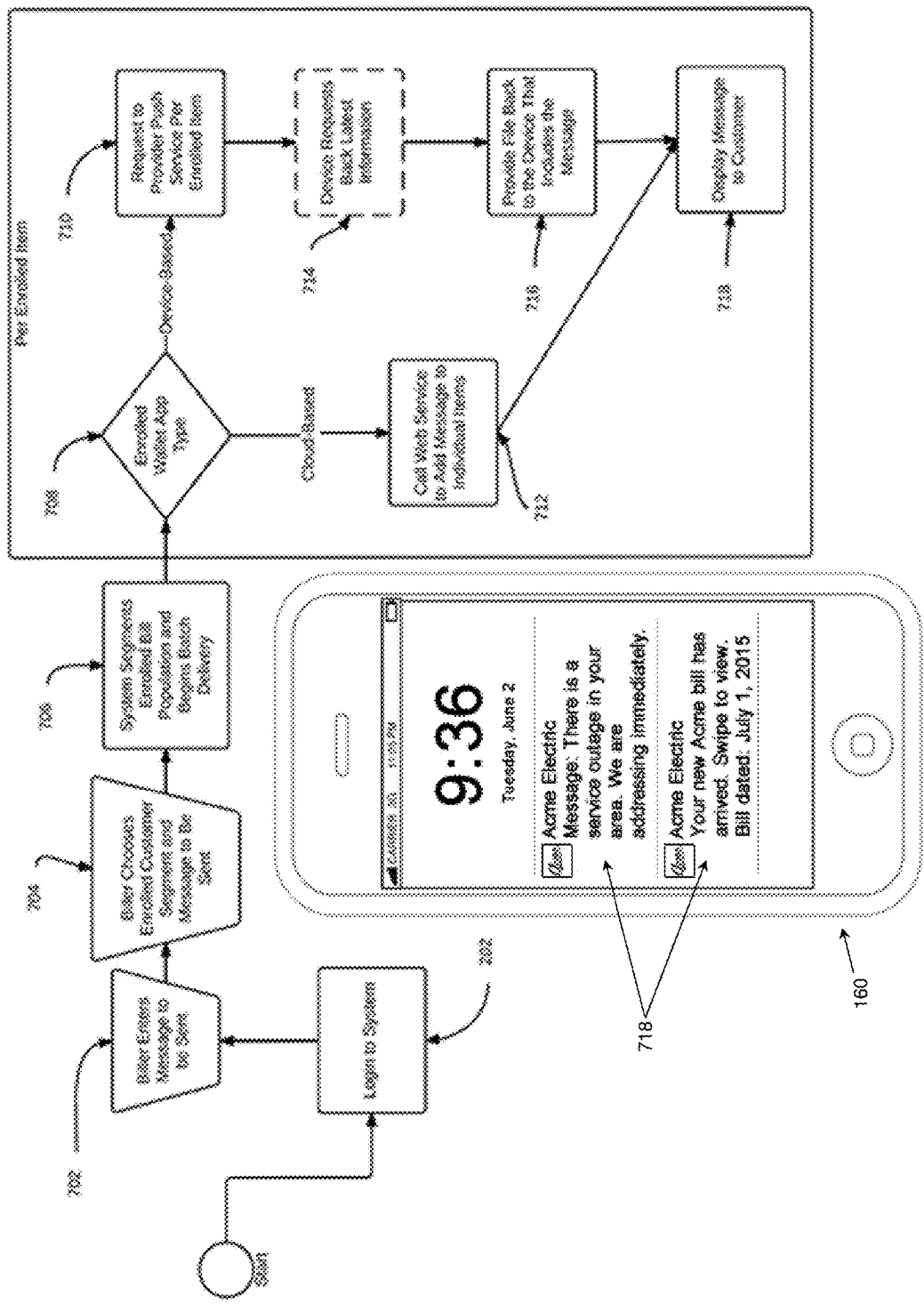
FIG. 7 is a flow chart illustrating processing performed in the receipt and dissemination of messages from the biller to the enrolled users (all or by segment)

FIG. 7 is an example flow chart illustrating processing performed in disseminating, for example, sales, customer service, messages to a segment of the entire population of enrolled users (regardless of enrolled wallet application type) that act as notifications to the consumer making them aware of events related to their customer relationship with the biller including payment reminders, offers, service changes, rewards points updates, and others. Flow may begin at 202 when the biller accesses the digital wallet bill management system 110 via, for example, a web application and logs in using provided credentials. From 202, flow may move to 702. In 702, the biller may enter a message or choose an existing message template to be sent. From 702, flow moves to 704. In 704 the billing user may select a segment or the entire enrolled population (depending on the desired reach of the biller) to receive the message. Messages may also be subject to the customer's notification preferences 442, and the system will automatically filter out those customers that have opted-out of a particular notification. From 704, the flow may move to 706. In 706, the messages may be processed by the digital wallet bill management system 110 to form, including the merge of personalized information from the variables of the digital wallet bill management system 110 if included in the message template, the messages deliver to the digital wallet provider. From 706, flow may move to 708. In 708, the enrolled customer records are reviewed for the platform type and a determination is made. From 708, flow may move to 710 if the digital wallet type is device-based or 712 if the digital wallet type is cloud-based. In 710, since device-based digital wallet may not support the direct delivery of messages and instead only notify users on changes to the content of the digital bill, the system can also deliver the content of the card with a piece of content that always changes and acts as a placeholder to simulate a change to the digital bill and act as a delivery mechanism for any message the biller wishes to send to the customer. In 712, with a cloud-based digital wallet type, a web service call may be made to request the latest digital bill from the system 110. From 712, flow may move to 718. In 710, with a device-based digital wallet type, a push notification may be sent to device 160. From 710, flow may move to 714. In 714, device 160 may request the latest information from the digital wallet bill management system 110. From 714, flow may move to 716. In 716 information may be returned to device 160 in a device-based wallet provider format. From 716, flow may move to 718. In 718, the message is displayed to the user. With a device-based wallet type, the device-based digital bill recognizes the updated message and displays it to the customer. With a cloud-based wallet type, the message is added to a running history contained within the visual representation of the digital bill.

Figure 8:
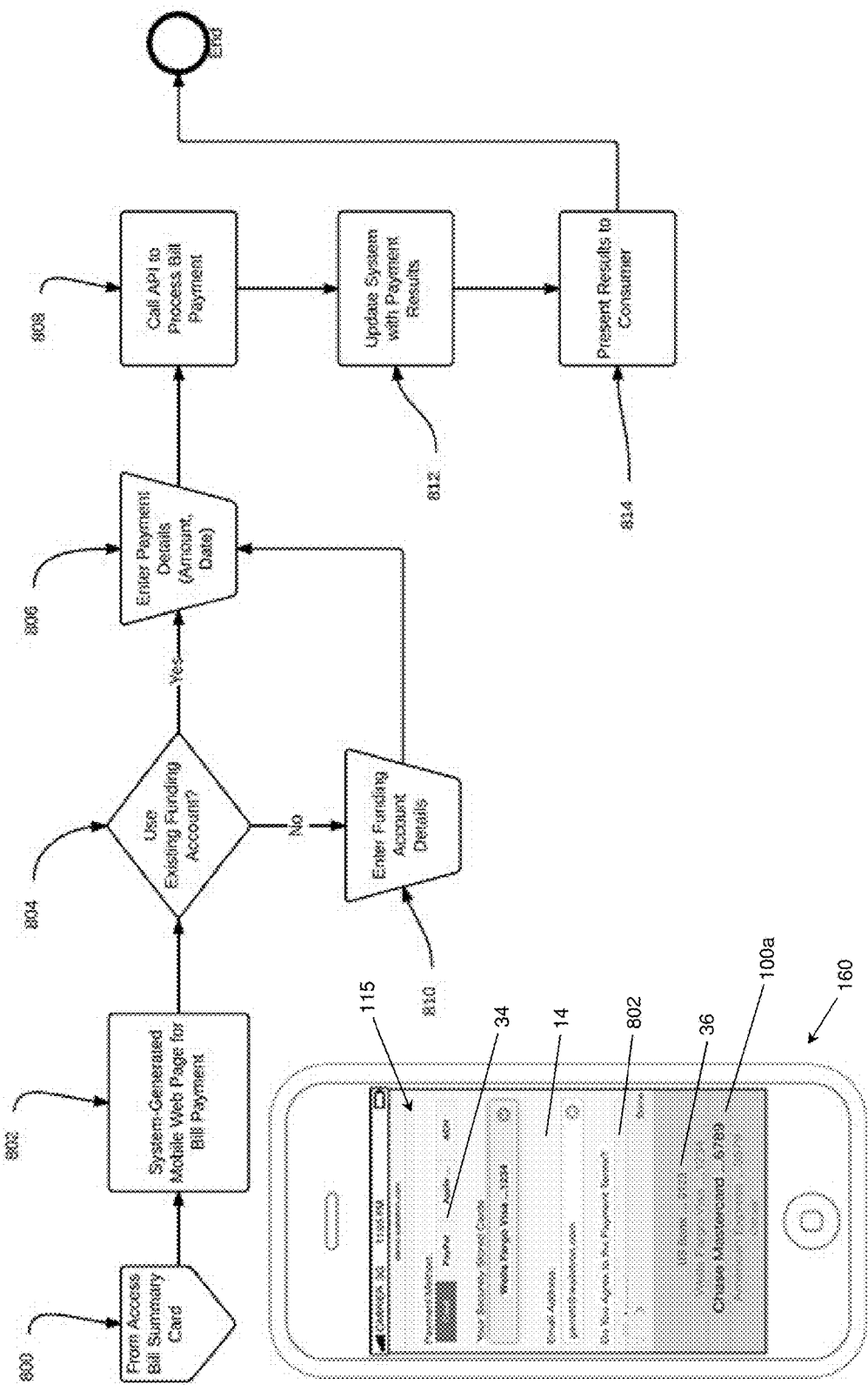
FIG. 8 is a flow chart illustrating the receipt and processing of a bill payment.

FIG. 8 (linked from FIG. 5) depicts an example flow chart illustrating payment instruction processing. Flow may start at 800. In 800, the content of the digital bill may include a link to a web page 802 of the digital wallet bill management system 110 to present, via a web browser 115, for example, on device 160, mobile-optimized web pages for the capture and processing of payment of the bill held in the digital wallet by the customer 150. It will be appreciated that in addition to the mobile bill presentment and payment e-card 14 (i.e., biller e-card) within the digital wallet application 195, the customer's digital wallet can have a payment option menu 34 (e.g., funding e-cards in the digital wallet, PayPal, Apple Pay, ACH) which may include links 36 to the funding e-cards 10, such as credit e-cards 10a, debit e-cards 10b, reward e-cards 10e and other e-cards 10c, 10d that are electronically linked to the customer's accounts 100 with various businesses as well as the customer's sources of funds, such as accounts with credit card companies 100a, checking and savings accounts with banks or other financial institutions 100b, 100c, 100d.

From 800, flow may move to 802. In 802, the web pages may be configurable to allow the biller 130 to choose the available payment types 34, content of the pages and/or processing business rules. The form of payment may be referenced by its identifying account attributes or make reference to a digital representation of the form of payment already resident in the customer's digital wallet. From 802 flow may move to 804. In 804, the digital wallet bill management system 110 may store previously used payment funding account information 100 and may give customer 150 a choice to enter new payment details or use existing details. From 804, flow may move to 806 if using a previous funding source 200 or 810 if using a new funding account. In 806, if using a previous funding source, the account is selected and payment details may be entered. In 810, if a new funding account is selected, the new account details may be entered and then the flow may move to 806 where payment information may be gathered. From 806, the flow may move to 808. In 808, the digital wallet bill management system 110 may be integrated to the biller's existing payment gateway 190 to process the bill payment in real-time by making a web service call to the gateway and receiving an immediate response on the success or failure of the payment request. Since the successful completion of a payment transaction requires the services of a payment gateway 190, the system 110 will send via a web service call, the data required to successfully execute the payment instruction received 808. From 808 the flow may move to 812. In 812, the digital wallet bill management system 110 may be updated with the results of the web service call 40. From 812 the flow may move to 814. In 814, customer 150 may be presented with a completion message 42, including transaction-level information like the payment confirmation number. From 814, flow may end.

Additionally, the digital wallet bill management system 101 may receive information from the biller 130 when the payment has posted to the biller's accounting system (residing, in one embodiment, at the biller and may be the core accounting and customer relationship management system) and may push an updated message to the digital bill in accordance with the process described in FIG. 6.

Figure 9:
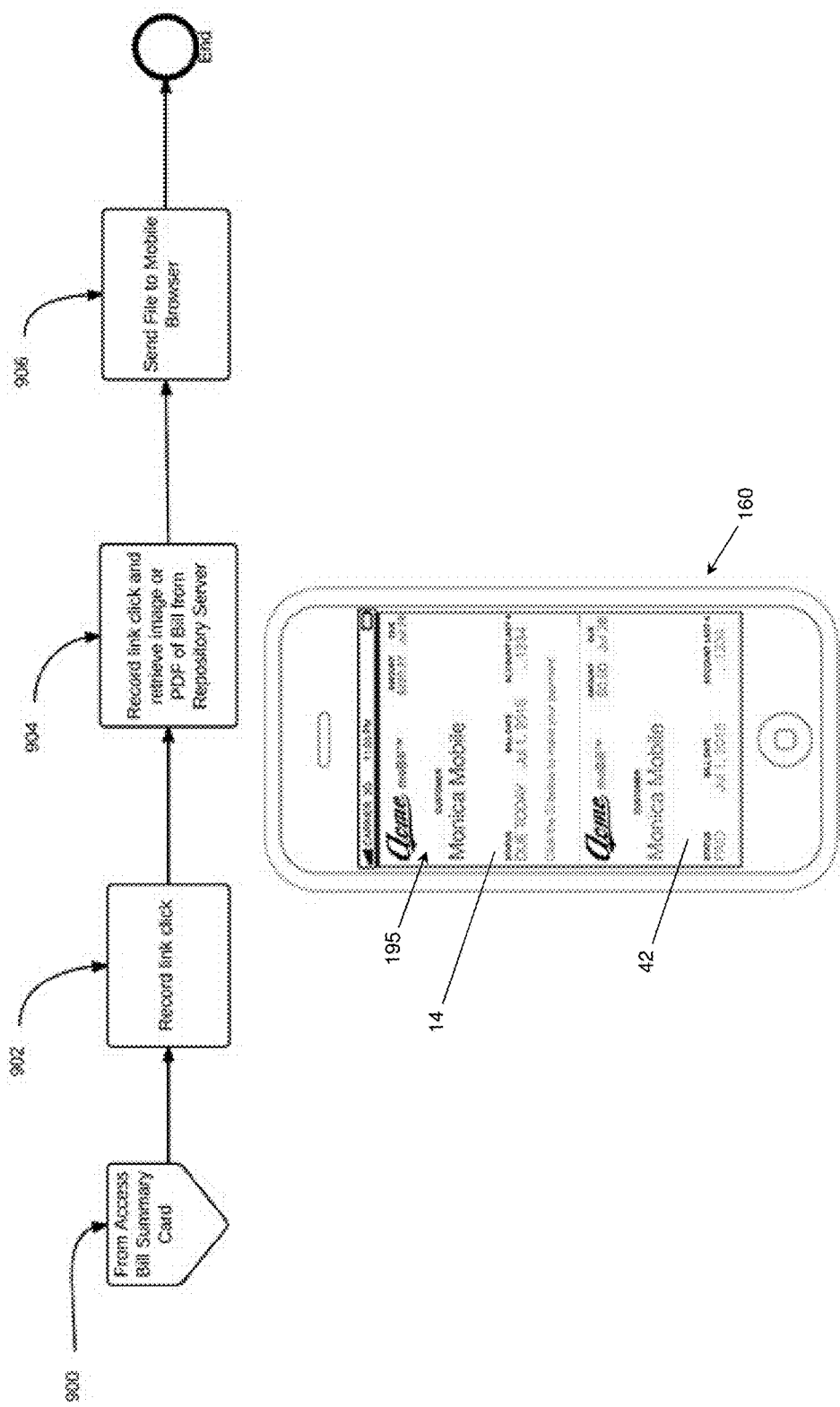
FIG. 9 is a flow chart illustrating processing performed in the presentment of a full billing statement to the user.

FIG. 9 is an example flow chart illustrating processing performed in the presentment of a full billing statement to the user (linked from FIG. 5). FIG. 9 depicts the digital wallet bill management system 110 retrieval of billing statement data using a key (account number and statement identifier) to retrieve, for example, a PDF file of the corresponding complete billing statement. In step 900, the content of the digital wallet bill includes a link to an external system provided by the biller 130 or BSP 140 that allows access via a URL to an image or PDF of the billing statement represented by the system-produced summary billing card 902. The link re-directs through the system to record the click 902 and then uses the built-in mobile browser to return the external file to the device and display the image or PDF of that billing statement 904. The system records for tracking purposes, the tap on the link, by using a redirect URL through the system, to reach the third party system and request the file to be returned.

FIG. 10 depicts an embodiment of the internal components of the digital bill management system 110. The system 110 connects with other entities through the network 120 via three primary interfaces: the web page interface 1004, the request-based application programming interface (Request API) 1006 and the file-based application programming interface (File API) 1008.

In one embodiment, the web page interface 1004 delivers HTML web pages to the network when requested by links to those pages from the network 120. The two primary sets of web pages are the administrative web pages 1010 and the digital bill payment web pages 802. The administrative pages are used for biller setup of templates (FIG. 2). The pages interact with the system's meta data processor 1030 which applies business rules and transforms the settings from the biller to those used by the system to manage digital bills within digital wallets the transformations may be used to store settings in an easily retrievable format in the system's database 1032 for use in formation of digital bills that are issued to the wallet providers 170, 180. The administrative web pages enable the biller to manage all digital bill information including data elements, geolocations, beacon identifiers, message templates, email templates, SMS templates, data sources and The payment web pages 802 are used to present digital bill data on a web page that is received from the digital bill via a web link 800. The page then receives user input that may include the desired amount, date and form of payment (checking account, savings account, credit card, debit card). The pages are designed to be optimally displayed on a mobile device to facilitate ease of user data entry on a phone or tablet-sized screen. The form of payment may be referenced by its identifying account attributes or make reference to a digital representation of a form of payment already resident in the customer's digital wallet or perform a web service call to the digital wallet provider's 170, 180 payment processing interface.

The Request API 1006 connects to the network to receive and send web service calls from various entities. When a request is received, it is then transmitted to the request parser 1012 to identify the originating digital wallet provider to then carry out the request within the application code for the cloud-based provider 1022 or the device-based provider 1024. Both request processors 1022 and 1024 can update the system database 1032 directly or interact with the Variable Meta Data Processor 1034 which transforms received data for more efficient use in rendering digital bill data back to the providers. The response processors 1026 and 1028 connect directly to the database 1032 and transform the stored information appropriate to the type of digital wallet provider back to the response parser 1014 that then sends the properly formatted response back through the Request API 1006 and back to the requesting entity through the network 120. A response may be passed through the system's segmentation engine 1036 that uses individual digital bill values that are mapped by the Variable Meta Data Processor 1034 and stored in the system's database 1032. The segmentation is used to filter responses to include a subset of the biller's customer that fit criteria set up by the biller via the administrative web pages 1010. Requests processed by the Request API may include Produce Distribution Code Snippets 216, Provide Wallet Landing Page 406, Present Web Landing Page 418, Send Wallet Item File to Device 416, Email Item 426, SMS Item 428, Enrollment Recorded in System 438, Request to Provider Push Service Per Enrolled Item 614, Call Web Service to Update Individual Items 616, Provide Latest File Back to the Device 620, Request to Provider Push Service Per Enrolled Item 710, Call Web Service to Add Message to Individual Items 712, and Provide File Back to the Device That Includes the Message 716.

The File API 1008 is used to receive billing data files from the biller 130 or billing service provider 140 through the network 120 to carry out the process of updating the biller's customers' digital bills (FIG. 6). The system receives files via the network 120 and places the files on the system 110 for processing. The file formats may include fixed width or delimited files which may also be encrypted in transmission and decrypted upon arrival by the API 1008. Upon receipt, the file is sent to the bill file parser 1016 to split the file into consumable parts, the individual bill records, that are then processed by the biller file mapper 1018 that transforms the individual bill records into system readable format per field per billing record and is then further transformed by the mapping processor 1020 to align with the biller-configured variables where the data is saved by the Variable Meta Data Processor 1034 into the system's database 1032. Requests processed by the File API may include Update Digital Bill (FIG. 6)

Figure 11:
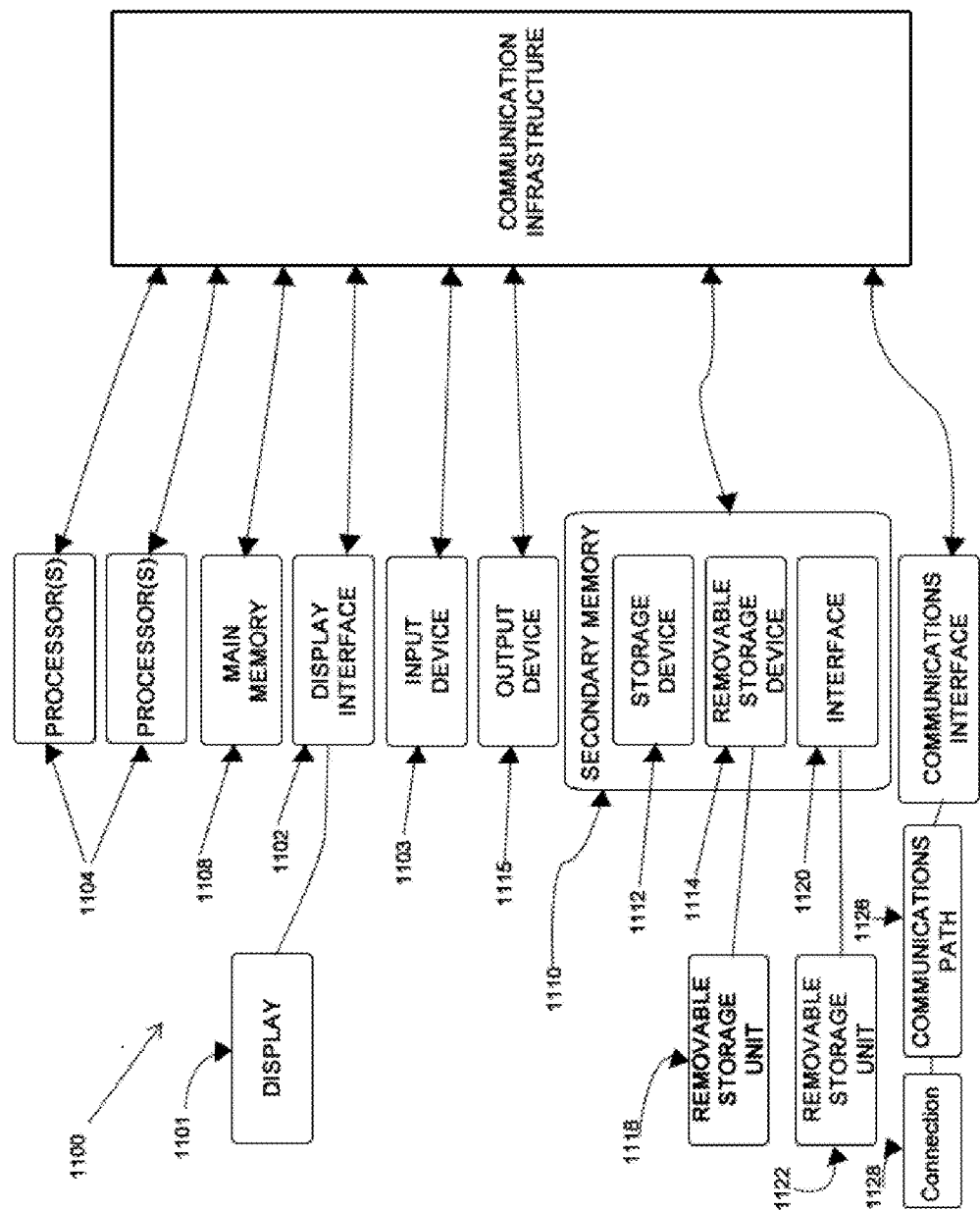
FIG. 11 depicts a computer processing system that may be used in implementing an embodiment of the present invention.

FIG. 11 depicts an example computer system that may be used in implementing an illustrative embodiment of the present invention. Specifically, FIG. 11 depicts an illustrative embodiment of a computer system 1100 that may be used in computing devices such as, e.g., but not limited to, standalone, client, server devices, or system controllers. FIG. 11 depicts an illustrative embodiment of a computer system that may be used as client device, a server device, a controller, etc. The present invention (or any part(s) or function(s) thereof) may be implemented using hardware, software, firmware, or a combination thereof and may be implemented in one or more computer systems or other processing systems. In fact, in one illustrative embodiment, the invention may be directed toward one or more computer systems capable of carrying out the functionality described herein. An example of a computer system 1100 is shown in FIG. 11, depicting an illustrative embodiment of a block diagram of an illustrative computer system useful for implementing the present invention. Specifically, FIG. 11 illustrates an example computer 1100, which in an illustrative embodiment may be, e.g., (but not limited to) a personal computer (PC) system running an operating system such as, e.g., (but not limited to) MICROSOFT® WINDOWS® NT/98/2000/XP/Vista/Windows 7/Windows 8, etc. available from MICROSOFT® Corporation of Redmond, Wash., U.S.A. or an Apple computer executing MAC® OS or iOS from Apple® of Cupertino, Calif., U.S.A or a smartphone running iOS, Android, or Windows mobile, for example. However, the invention is not limited to these platforms. Instead, the invention may be implemented on any appropriate computer system running any appropriate operating system. In one illustrative embodiment, the present invention may be implemented on a computer system operating as discussed herein. An illustrative computer system, computer 1100 is shown in FIG. 11. Other components of the invention, such as, e.g., (but not limited to) a computing device, a communications device, a telephone, a personal digital assistant (PDA), an iPhone, a 3G/4G wireless device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 11. In an illustrative embodiment, services may be provided on demand using, e.g., an interactive television device (iTV), a video on demand system (VOD), via a digital video recorder (DVR), and/or other on demand viewing system. Computer system 1100 may be used to implement the network and components as described above.

The computer system 1100 may include one or more processors, such as, e.g., but not limited to, processor(s) 1104. The processor(s) 1104 may be connected to a communication infrastructure 1106 (e.g., but not limited to, a communications bus, cross-over bar, interconnect, or network, etc.). Processor 1104 may include any type of processor, microprocessor, or processing logic that may interpret and execute instructions (e.g., for example, a field programmable gate array (FPGA)). Processor 1104 may comprise a single device (e.g., for example, a single core) and/or a group of devices (e.g., multi-core). The processor 1104 may include logic configured to execute computer-executable instructions configured to implement one or more embodiments. The instructions may reside in main memory 1108 or secondary memory 1110. Processors 1104 may also include multiple independent cores, such as a dual-core processor or a multi-core processor. Processors 1104 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention and/or parts of the invention using other computer systems and/or architectures.

Computer system 1100 may include a display interface 1102 that may forward, e.g., but not limited to, graphics, text, and other data, etc., from the communication infrastructure 1106 (or from a frame buffer, etc., not shown) for display on the display unit 1101. The display unit 1101 may be, for example, a television, a computer monitor, a touch sensitive display device, or a mobile phone screen. The output may also be provided as sound through, for example, a speaker.

The computer system 1100 may also include, e.g., but is not limited to, a main memory 1108, random access memory (RAM), and a secondary memory 1110, etc. Main memory 1108, random access memory (RAM), and a secondary memory 1110, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 1110 may include, for example, (but is not limited to) a hard disk drive 1112 and/or a removable storage drive 1114, representing a floppy diskette drive, a magnetic tape drive, an optical disk drive, a compact disk drive CD-ROM, flash memory, etc. The removable storage drive 1114 may, e.g., but is not limited to, read from and/or write to a removable storage unit 1118 in a well-known manner. Removable storage unit 1118, also called a program storage device or a computer program product, may represent, e.g., but is not limited to, a floppy disk, magnetic tape, optical disk, compact disk, etc. which may be read from and written to removable storage drive 1114. As will be appreciated, the removable storage unit 1118 may include a computer usable storage medium having stored therein computer software and/or data.

In alternative illustrative embodiments, secondary memory 1110 may include other similar devices for allowing computer programs or other instructions to be loaded into computer system 1100. Such devices may include, for example, a removable storage unit 1122 and an interface 1120. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 1122 and interfaces 1120, which may allow software and data to be transferred from the removable storage unit 1122 to computer system 1100.

Computer 1100 may also include an input device 1103 which may include any mechanism or combination of mechanisms that may permit information to be input into computer system 1100 from, e.g., a user or operator. Input device 1103 may include logic configured to receive information for computer system 1100 from, e.g. a user or operator. Examples of input device 1103 may include, e.g., but not limited to, a mouse, pen-based pointing device, or other pointing device such as a digitizer, a touch sensitive display device, and/or a keyboard or other data entry device (none of which are labeled). Other input devices 1103 may include, e.g., but not limited to, a biometric input device, a video source, an audio source, a microphone, a web cam, a video camera, and/or other camera.

Computer 1100 may also include output devices 1115 which may include any mechanism or combination of mechanisms that may output information from computer system 1100. Output device 1115 may include logic configured to output information from computer system 1100. Embodiments of output device 1115 may include, e.g., but not limited to, display 1101, and display interface 1102, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Computer 1100 may include input/output (I/O) devices such as, e.g., (but not limited to) input device 1103, communications interface 1124, connection 1128 and communications path 1126, etc. These devices may include, e.g., but are not limited to, a network interface card, onboard network interface components, and/or modems.

Communications interface 1124 may allow software and data to be transferred between computer system 1100 and external devices or other computer systems. Computer system 1100 may connect to other devices or computer systems via wired or wireless connections. Wireless connections may include, for example, WiFi, satellite, mobile connections using, for example, TCP/IP, 802.15.4, high rate WPAN, low rate WPAN, 6loWPAN, ISA100.11a, 802.11.1, WiFi, 3G, WiMAX, 4G and/or other communication protocols.

According to the description of the invention above, it is apparent that the present invention provides a methodology and a system which uses a code snippet activator that allows billers or their biller service providers to create mobile bill presentment and payment e-cards for the billers' respective customers which are housed within the customers' digital wallet applications. Generally, the code snippet information bridges the financial e-cards which customers already have in their respective digital wallet applications with the billers' e-cards which are created in the billers' digital wallet system applications and then also housed within the customers' digital wallet applications.

It will be appreciated that the billers' digital wallet system applications could be the billers' existing computerized billing system which may interact with the Walletron digital wallet bill management system 110 or it may be its own fully integrated enterprise system which contains a digital wallet tool as a part of the billers' computerized billing system. As evident from the description of the processes above with respect to FIGS. 2-9, the bill presentment and bill payment process is performed with computerized billing systems that interface with the digital wallet bill management system 110 through networked communications. The digital wallet bill management system runs on one or more centralized computer processors that interface with one or more databases according to the steps listed below. As described above with respect to FIGS. 1 and 10, the digital wallet system application's digital wallet bill management system 110 is in networked communication with digital wallet service providers that may have a device-based system 170 or cloud-based system 180. The digital wallet bill management system 110 is also in networked communications with payment gateways 190 and the customer digital wallet applications 195.

The digital wallet bill management system communicates with digital wallet service providers over the communication network, communicating with at least one biller and payment processor and also communicating with at least one payment gateway used by the biller.

The digital wallet bill management system receives configuration information from the billers through the communication network. The configuration information allows for data delivery to the billers through their digital wallet system application. The configuration information includes setup of bill presentment and bill payment presentment and may also include content delivery, message presentment and notification presentment.

The digital wallet bill management system transmits code snippet activators through the communication network to customers or the code snippet activator may be printed as a scannable image (i.e., bar code, QR code) on a piece of physical mail that is sent to the customer. The code snippet activators link customer accounts to the billers' digital wallet bill management system in the digital wallet system application through the digital wallet application resident in the customers' electronic devices.

The digital wallet bill management system registers a unique customer of a particular biller when the unique customer activates the corresponding code snippet activator through their user-specific electronic device.

The digital wallet bill management system transmits a digital bill through the communication network to the unique customer of the particular biller using a mobile bill presentment and payment e-card within a digital wallet application resident on the user-specific electronic device.

In addition to the basic functionality listed above, digital wallet bill management system 110 also distributes updated digital bills 14" with updated bill detail information 40 and transmits messages to the user-specific electronic devices. The user-specific electronic devices correspond to registered customers 150 according to the registering step to product the mobile bill presentment and payment e-card 14 within the customers' respective digital wallet applications 195. With regard to transmitting messages, the digital wallet bill management system populates a template message 14' with customer notifications 40, such as payment reminders, past due notices, special offers, service changes, service notices, customer reward updates, etc. The message preferably includes a hyperlink 508 to a corresponding mobile bill presentment and payment e-card 14 within the digital wallet application. To process bill payments from the customers for their digital bills 14", the digital wallet bill management system 110 connects the respective customer's digital wallet application 195 to payments web pages 802. Similarly, to present a full electronic copy of the digital bill to the respective customer, the digital wallet bill management system connects the customer's electronic device to a bill repository 904, 130, 140 which contains the billing details 18". In connecting to payment web pages 802, the digital bill 14" is linked to system provided web pages, and the payment instruction is ultimately processed through the biller's payment gateway 190. The digital bill linkage includes digital bill data 18" that pre-populates the web pages and may be available by directly connecting to the biller's billing system 130, 140 or may retrieved through the digital wallet bill management system 110. Similarly, to obtain the billing details for the digital bill 14", the system 110 links the digital bill to a web linked bill repository and returns the requested bill file to the user-specific electronic device of the unique customer. It will be appreciated that the communications between the billers and the payment processors may be direct between themselves or indirect, having communication with at least one consolidator acting on behalf one or more of the billers.

To begin the registration of the customers for particular billers 130, the customers tap, select, click or otherwise activate the snippet code activator 12. The customers may select a hyperlink 30 in an electronic document 30a, 30b, 30c and/or may scan an image 28 in an electronic document 30a, 30b, 30c or a physical document 28a. Registration continues when the digital wallet bill management system 110 receives the request 24 from the user-specific electronic device 160 for the unique customer 150 that is produced by the customer's activation of the code snippet activator 12. The system 110 parses the request to determine whether the request is for a cloud-based digital wallet provider 180 or a device-based digital wallet provider 170 and provides a confirmation of enrollment to the unique customer through the user-specific electronic device 160 based on the type of digital wallet provider and the type of user-specific electronic device. For a cloud-based digital wallet provider 180, the system returns a web page 406 to the user-specific electronic device that includes a button 408 to complete the enrollment process for the unique customer. For a device-based digital wallet provider 170 with a request from a smartphone device 160, the system delivers a transformed file to the smartphone device in a digital wallet-ready format 416 by receiving a web service call from the user-specific electronic device to complete the enrollment. For a device-based digital wallet provider with a request that is not from a smartphone, the system returns a web page 418 to the user-specific electronic device to present the customer with the option to email 420, SMS 422 or scan an image 424 to access the desired file. At the completion of the registration process, the digital wallet bill management system creates the mobile bill presentment and payment e-card 14 for the particular biller in the digital wallet application 195 for the unique customer 150. The mobile bill presentment and payment e-card 14 includes a listing 36 of payment selection options available from selectable financial accounts 100, such as credit card accounts 100a, debit card accounts 100b, bank savings accounts 100c, bank checking accounts 100d, and prepaid funding accounts 100e.

There are a number of ways that can be used to distribute updated digital bills to the mobile bill presentment and payment e-card in the customers' respective digital wallet applications. In one embodiment, the digital wallet bill management system receives billing data via a file from the biller or biller service provider, parses the file into the individual bill records for the customers, and parses the individual fields of the bill records that are mapped to a set of biller-defined variables. The system may store the individual values of the variables in a database and then assemble a digital wallet-ready response by combining configuration settings for the particular biller including design, format and data mapping specifications, the individual bill data and rules specific to the type of digital wallet provider and type of user-specific electronic device. The system can then transform the data into a digital wallet-ready response with updated digital bill information for each one of the customers, running the individual bill records through a segmentation engine to filter out those customers that should not receive an update based on biller-defined rules, thereby producing a distribution list. The system then sends the updated bill information in a format corresponding with the digital wallet service provider (device-based or cloud-based) for each one of the customers in the distribution list.

Creating and sending messages can also be performed through the digital wallet bill management system. It is possible to send messages to the customers in the mobile bill presentment and payment e-card in the customers' respective digital wallet applications or messages may be sent in text form or e-mail form which may contain links to the mobile bill presentment and payment e-card. The system receives a messaging request from a biller and populates a template message with dynamic variable information. The dynamic variable information could be any type of message described in detail above and can also be a billing notice with a hyperlink to a corresponding mobile bill presentment and payment e-card within the digital wallet application. The system forms the response with the merged message data, runs the customers through a segmentation engine to filter out a segment that should not receive a message based on biller-defined rules, and sends the message to the digital wallet service providers for forwarding to the customers.

Without departing from the invention as generally described above for the digital wallet bill management system and its corresponding method of operation, an illustrative example for the use and operation of the digital wallet bill management system is now provided. As indicated above, the code snippet can be actual digital bits of code, or a link to the code (can use a URL shortening device), or some type of readily scannable code (barcode or QR code provided as examples, and any other scannable coded image). When the customer activates the code snippet, such as by clicking on a link in an electronic document or scanning an image code, the digital wallet bill management system automatically creates a new biller "e-card" that is stored in the customer's digital wallet application as shown in FIG. 1 and provides optional payment connections between the customer's biller e-card and existing payment/funding e-cards that the customer already has stored in the digital wallet application as shown in FIG. 5.

The digital wallet bill management system 110 creates the code snippet activators 12 with the corresponding links back to the various billers to use with the digital wallet systems 195, and the billers 130 provide their respective snippets to the customer/end user 150. When the customer/end user activates the snippet, the system builds the bridge between the biller and the customer/end user with a digital wallet account that appears as a "card" in the user's digital wallet. In the case of a credit card in which the customer uses the card to pay for goods and services and then periodically pays off the balance (a "Rewards Member" Visa card for example, such as one for Southwestern Airlines), the customer may have two (2) digital wallet cards (e-card) for their Reward Members Visa. One of the e-cards in the customer's digital wallet application for the Rewards Member Visa would be the typical e-credit card 10a which that the customer can use to pay for goods and services, and the other Reward Members Visa e-card would be the biller e-card 16 which the biller and customer use for the e-bill presentation and payment. For example, in paying off the Reward Members Visa e-bill through the digital wallet, the customer may select a link 36 to their checking account 100d, such as shown in FIG. 8, which would create an electronic funds transfer (EFT) or other type of electronic bill payment from the US Bank checking account to the Reward Members Visa. Information from the US Bank checking account could also be presented in another e-card 10d in the customer's digital wallet. Similarly, the customer may have a Southwest Airlines frequent flyer rewards e-card 110 within the customer's digital wallet that provides the customer with reward points information and other rewards management functionality. A payment e-card is not required to make payment toward the billing e-card, but is one of the available mechanisms to do so.

The present invention can be further appreciated from the perspective of the customer/bill payer 150 who is managing electronic bill payments using a digital wallet application 195 or bank-based bill payment service. Generally, the customer's digital wallet application or bank-based bill payment service has several funding sources (represented by e-cards 10 in the digital wallet) that correspond to customer's funding accounts 100 with one or more financial institutions 200. For example, the funding accounts could be a cash savings 100c or checking account 100d, a credit card account 100a, a prepaid debit card 100b, or some other type of account with funds that are available to the customer, such as a money market savings account. As explained in detail above, the user-specific electronic device would first receive a code snippet activator 12 to setup the biller e-card 14 within the digital wallet application 195 or in their bank-based bill payment service and would thereafter receive electronic bill notifications which may or may not include the code snippet activator. The customer selects the electronic bill notification and the code snippet activator 12 to launch the digital wallet application resident on the user-specific electronic device 160, and the digital wallet application 195 or bank-based bill payment service provides the biller e-card 14 with an amount due and a payment selection option 36 listing various funding e-cards 10 within the digital wallet application. The customer can select a funding source and associate it with the biller e-card 10 for an electronic bill payment and authorizes the electronic bill payment from within the digital wallet application.

In this document, the terms "computer program medium" and "computer readable medium" may be used to generally refer to media such as, e.g., but not limited to, removable storage drive 1114, a hard disk installed in hard disk drive 1112, flash memories, removable discs, non-removable discs, etc. In addition, it should be noted that various electromagnetic radiation, such as wireless communication, electrical communication carried over an electrically conductive wire (e.g., but not limited to twisted pair, CAT5, etc.) or an optical medium (e.g., but not limited to, optical fiber) and the like may be encoded to carry computer-executable instructions and/or computer data that embodiments of the invention on e.g., a communication network. These computer program products may provide software to computer system 1100. It should be noted that a computer-readable medium that comprises computer-executable instructions for execution in a processor may be configured to store various embodiments of the present invention. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may. The various embodiments described herein may be combined and/or features of the embodiments may be combined to form new embodiments.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device. Embodiments may be embodied in many different ways as a software component. For example, according to the embodiments described above, the digital wallet bill management system may be a stand-alone software package that interfaces with the billers' separate respective computerized billing systems, or it may be a software package incorporated as a "tool" in a larger software product, such as, for example, a software billing system with a digital wallet tool. Accordingly, although the embodiments described above contemplate digital wallet service providers supporting billers and their biller service providers, it is equally possible for a biller to host its own digital wallet bill management system that interfaces directly with the digital wallet applications in the customer's electronic devices. It may be downloadable from a network, for example, a website, as a stand-alone product or as an add-in package for installation in an existing software application. It may also be available as a client-server software application, or as a web-enabled software application. It may also be part of a system for administering billing, servicing messaging, and payment in digital wallets. Computer system 1100 may be used to create a general purpose computer. A general purpose computer may be specialized by storing programming logic that enables one or more processors to perform the techniques indicated herein and one or more of the steps of FIGS. 2-9 and as schematically illustrated in FIGS. 1 and 10. Computer system 1100 or multiple embodiments of computer system 1100 as schematically illustrated in FIG. 11 may be used to perform the functions described above.

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents. The embodiments of the present invention that have been described above may contain features that may be removed or combined between the described embodiments to derive additional embodiments.

What is claimed is:

1. A digital wallet bill management system for processing an electronic bill payment, comprising:
   a digital wallet application in a user-specific electronic device, the digital wallet application comprising at least one funding e-card for a unique customer, wherein the funding e-card corresponds to a funding account with a financial institution for the unique customer;
   a code snippet activator comprised of a URL code, at least one biller code for a particular biller, and at least one customer code for the unique customer, wherein at least a portion of the URL code corresponds with a network address of the digital wallet bill management system;
   a selection of the code snippet activator entered into the user-specific electronic device;
   an electronic communication containing the biller code and the customer code, wherein the user-specific electronic device sends the electronic communication to the network address in response to the selection of the code snippet activator; and
   a biller e-card for the particular biller stored in the digital wallet application for the unique customer, wherein biller e-card information is received from the digital wallet bill management system according to the biller code and the customer code, wherein the selection of the code snippet activator causes the digital wallet application on the user-specific electronic device to activate and receive the biller e-card information from the digital wallet bill management system and to also create the biller e-card in the digital wallet application according to the biller e-card information, and wherein the biller e-card further comprises a digital bill with a payment option.

2. The digital wallet bill management system of claim 1, further comprising:
   a plurality of funding e-cards stored in the digital wallet application, wherein the funding e-cards correspond to a plurality of funding accounts belonging to the unique customer; and
   a plurality of biller e-cards stored in the digital wallet application, wherein the biller e-cards correspond to a set of billing accounts for the unique customer and a respective set of billers.

3. The digital wallet bill management system of claim 2, further comprising a payment option in the digital bill and a web browser application, wherein the web browser application is in local communication with the digital wallet application and operates on the user-specific electronic device, wherein the funding accounts are selected from a group of accounts consisting of a credit card account, a debit card account, a bank savings account, a bank checking account, a prepaid funding account, and any combination thereof, wherein the payment option is at least one of a payment link in the digital wallet application and a hyperlink to a payment webpage accessed through the web browser, and wherein the payment link connects at least one of the funding e-cards to the digital bill for the particular biller in the biller e-card.

4. The digital wallet bill management system of claim 1, further comprising a centralized processor and a database in operative communication with the digital wallet application, wherein the centralized processor receives the biller code and the customer code through the URL address, matches the biller code and the customer code with data stored in the database for the particular biller and the unique customer, respectively, prepares the biller e-card information using information in the biller code and the customer code, and transmits the biller e-card information to the user-specific electronic device for the digital wallet application.

5. The digital wallet bill management system of claim 4, further comprising a plurality of user-specific electronic devices, wherein each of the user-specific electronic devices has the digital wallet application for a corresponding one of a plurality of unique customers and a respective set of billers, wherein the digital wallet application in each one of the user-specific electronic devices is at least one of a cloud-based application and a device-based application, and wherein the centralized processor receives the corresponding biller code and the customer code through the URL address for each one of the unique customers, matches the biller code and the customer code with data stored in the database for each one of the billers and each one of the unique customers, respectively, prepares the biller e-card information using information in the biller code and the customer code for each one of the billers and each one of the unique customers, respectively, and transmits the biller e-card information to each one of the user-specific electronic devices for the corresponding digital wallet application.

6. The digital wallet bill management system of claim 1, further comprising a single-action biller e-card setup for the digital wallet application, wherein in response to the activation of the code snippet activator, the digital wallet application parses the network address from the URL code, and produces the electronic communication.

7. The digital wallet bill management system of claim 1, wherein the URL code further comprises at least one of a security token and a billing template identifier.

8. The digital wallet bill management system of claim 1, wherein the code snippet activator is at least one of a portion of a hyperlink in an electronic document and a data-coded image formed in at least one of the electronic document and a physical document, wherein the electronic document is selected from the group of documents consisting of an email, a text, an SMS text, a webpage, and any combination thereof, wherein the data-coded image is at least one of a bar code and a QR code, and wherein the selection of the code snippet activator is at least one of a clicked hyperlink and a scanned data-coded image.

9. The digital wallet bill management system of claim 1, further comprising a plurality of funding e-cards stored in the digital wallet application, wherein the funding e-cards are selected from a group of e-cards consisting of a credit e-card, a debit e-card, a checking e-card, and any combination thereof, wherein the payment option is comprised of a payment link in the digital wallet application connecting at least one of the funding e-cards to the digital bill for the particular biller in the biller e-card.

10. The digital wallet bill management system of claim 1, further comprising a web browser application in local communication with the digital wallet application and operating on the user-specific electronic device, wherein the payment option is comprised of a hyperlink to a payment webpage accessed through the web browser.

11. A digital wallet bill management system for processing an electronic bill payment, comprising:
   a digital wallet application resident on a user-specific electronic device;
   an electronic bill notification received by the user-specific electronic device;
   a selection of the electronic bill notification on the user-specific electronic device, wherein the selection of the electronic bill notification causes the digital wallet application on the user-specific electronic device to activate and enable a digital bill to be received by the digital wallet application;
   a funding e-card stored in the digital wallet application for a unique customer, wherein the funding e-card corresponds to a funding account with a financial institution for the unique customer;
   a biller e-card stored in the digital wallet application for a particular biller, wherein the biller e-card corresponds to a billing account for the unique customer with the particular biller, and wherein the digital wallet application populates the biller e-card with the digital bill and provides a payment option for the digital bill;
   a web browser application in local communication with the digital wallet application and resident on the user-specific electronic device; and
   wherein the payment option is at least one of a first payment option and a second payment option, wherein the first payment option is a payment link in the digital wallet application connecting the funding e-card to the digital bill for the particular biller in the biller e-card, wherein the second payment option is a hyperlink to a payment webpage accessed through the web browser, and wherein a selection of the payment option causes the digital wallet application on the user-specific electronic device to activate the web browser application and open the hyperlink to the payment webpage.

12. The digital wallet bill management system of claim 11, further comprised of:
   a code snippet activator comprised of a URL code, at least one biller code for a particular biller, and at least one customer code for the unique customer, wherein at least a portion of the URL code corresponds with a network address of the digital wallet bill management system; and
   an electronic communication containing the biller code and the customer code, wherein the user-specific electronic device sends the electronic communication to the network address in response to an activation of the code snippet activation.

13. The digital wallet bill management system of claim 12, further comprising a centralized processor and a database in operative communication with the digital wallet application, wherein the centralized processor receives the biller code and the customer code through the URL address, matches the biller code and the customer code with data stored in the database for the particular biller and the unique customer, respectively, prepares the biller e-card information using information in the biller code and the customer code, and transmits the biller e-card information to the user-specific electronic device for the digital wallet application.

14. The digital wallet bill management system of claim 11, wherein the selection of the payment option causes the digital wallet application on the user-specific electronic device to activate the payment link within the digital wallet application between the funding e-card and the biller e-card.

15. The digital wallet bill management system of claim 14, further comprising:
   a plurality of funding e-cards stored in the digital wallet application, wherein the funding e-cards correspond to a plurality of funding accounts belonging to the unique customer;
   a plurality of biller e-cards stored in the digital wallet application, wherein the biller e-cards contain a plurality of digital bills, and wherein the biller e-cards and digital bills correspond to a set of billing accounts for the unique customer and a respective set of billers; and
   a plurality of payment options in the digital bills are comprised of payment pathways consisting of a plurality of payment links in the digital wallet application, a plurality of hyperlinks to at least the payment webpage, a plurality of hyperlinks to a plurality of payment webpages, and any combination thereof.

16. A digital wallet bill management system for processing an electronic bill payment, comprising:
   a digital wallet application resident on a user-specific electronic device;
   a funding e-card stored in the digital wallet application for a unique customer;
   a biller e-card stored in the digital wallet application for a particular biller, wherein the biller e-card corresponds to a billing account for the unique customer with the particular biller, and wherein the biller e-card is further comprised of a digital bill with a payment option;
   a code snippet activator comprised of a URL code associated with the digital wallet bill management system, at least one biller code for the particular biller, and at least one customer code for the unique customer, wherein the biller e-card is produced by an activation of the code snippet activator; and
   a selection of the code snippet activator entered into the user-specific electronic device, wherein the selection of the code snippet activator causes the digital wallet application on the user-specific electronic device to be activated and sends an electronic communication with the biller code and the customer code to the digital wallet bill management system associated with the URL code.

17. The digital wallet bill management system of claim 16, wherein the funding e-card corresponds to a funding account with a financial institution for the unique customer, wherein the biller e-card is further comprised of a digital bill presentation and an electronic bill payment interface, wherein the payment option link provides a payment pathway between the funding account and the particular biller in the electronic bill payment interface, wherein at least a portion of the URL code in the code snippet activator corresponds with a network address of the digital wallet bill management system, and wherein the user-specific electronic device sends the electronic communication to the network address in response to the selection of the code snippet activator.

18. The digital wallet bill management system of claim 17, further comprising:

a centralized processor and a database in operative communication with the digital wallet application, wherein the centralized processor receives the biller code and the customer code through the URL address, matches the biller code and the customer code with data stored in the database for the particular biller and the unique customer, respectively, prepares the biller e-card information using information in the biller code and the customer code, and transmits the biller e-card information to the user-specific electronic device for the digital wallet application; and a single-action biller e-card setup for the digital wallet application, wherein in response to the activation of the code snippet activator, the digital wallet application parses the network address from the URL code, produces the electronic communication, receives the biller e-card information from the centralized processor, and creates the biller e-card in the digital wallet application according to the biller e-card information.

19. The digital wallet bill management system of claim 16, further comprising a web browser application in local communication with the digital wallet application and operating on the user-specific electronic device, wherein the payment option is at least one of a first payment option and a second payment option, wherein the first payment option is a payment link in the digital wallet application connecting the funding e-card to the digital bill for the particular biller in the biller e-card, and wherein the second payment option is a hyperlink to a payment webpage accessed through the web browser.

20. The digital wallet bill management system of claim 16, wherein the URL code further comprises at least one of a security token and a billing template identifier, wherein the code snippet activator is at least one of a hyperlink in an electronic document, an image in an electronic document, and an image in a physical document.

* * * * *